(12) United States Patent
Matsuyama et al.

(10) Patent No.: US 9,309,427 B2
(45) Date of Patent: Apr. 12, 2016

(54) INK COMPOSITION, INK CARTRIDGE, INKJET RECORDING DEVICE, AND INKJET PRINTED MATTER

(71) Applicants: Akihiko Matsuyama, Shizuoka (JP); Mitsuru Naruse, Shizuoka (JP); Masayasu Nonogaki, Shizuoka (JP); Kazukiyo Nagai, Shizuoka (JP); Keita Katoh, Shizuoka (JP); Yuusuke Koizuka, Shizuoka (JP)

(72) Inventors: Akihiko Matsuyama, Shizuoka (JP); Mitsuru Naruse, Shizuoka (JP); Masayasu Nonogaki, Shizuoka (JP); Kazukiyo Nagai, Shizuoka (JP); Keita Katoh, Shizuoka (JP); Yuusuke Koizuka, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/456,287

(22) Filed: Aug. 11, 2014

(65) Prior Publication Data
US 2015/0064425 A1 Mar. 5, 2015

(30) Foreign Application Priority Data

Sep. 4, 2013 (JP) ................. 2013-182828
Jun. 11, 2014 (JP) ................. 2014-120565

(51) Int. Cl.
| | | |
|---|---|---|
| *C09D 11/322* | (2014.01) | |
| *C08L 43/02* | (2006.01) | |
| *C09D 11/107* | (2014.01) | |
| *C09D 11/326* | (2014.01) | |
| *C09D 11/38* | (2014.01) | |

(52) U.S. Cl.
CPC ............ *C09D 11/322* (2013.01); *C09D 11/107* (2013.01); *C09D 11/326* (2013.01); *C09D 11/38* (2013.01); *Y10T 428/24901* (2015.01)

(58) Field of Classification Search
CPC ............................. C09D 11/322; C08L 43/02
USPC ........................................................ 524/192
See application file for complete search history.

(56) References Cited

U.S. PATENT DOCUMENTS

| | | | |
|---|---|---|---|
| 2012/0242741 A1 | 9/2012 | Hasegawa et al. | |
| 2012/0328854 A1 | 12/2012 | Matsuyama et al. | |
| 2014/0072779 A1 | 3/2014 | Matsuyama et al. | |
| 2014/0092180 A1* | 4/2014 | Matsuyama et al. | 347/86 |
| 2014/0120331 A1 | 5/2014 | Koizuka et al. | |
| 2014/0141209 A1 | 5/2014 | Koizuka et al. | |
| 2014/0199530 A1* | 7/2014 | Katoh et al. | 428/207 |

FOREIGN PATENT DOCUMENTS

| | | |
|---|---|---|
| JP | 2002-138233 | 5/2002 |
| JP | 2011-122072 | 6/2011 |
| JP | 2014-136747 | 7/2014 |

* cited by examiner

*Primary Examiner* — Vu A Nguyen
(74) *Attorney, Agent, or Firm* — Oblon, McClelland, Maier & Neustadt, L.L.P.

(57) ABSTRACT

An ink composition contains a pigment; a copolymer comprising a phosphoric acid group or phosphonic acid group; a hydrosoluble solvent; and water, wherein the pigment is represented by the following chemical formula 1 and satisfies the following relation 1:

$Y/X \leq 0.20$      Relation 1 where X represents a peak intensity at a Bragg ($2\theta \pm 0.2°$) angle in a range of $2\theta$ of from 26.5° to 27.5° and Y represents a peak intensity at a Bragg ($2\theta \pm 0.2°$) angle in a range of $2\theta$ of from 11.0° to 11.5° to a CuKα X-ray having a wavelength of 1.541 Å.

Chemical formula 1
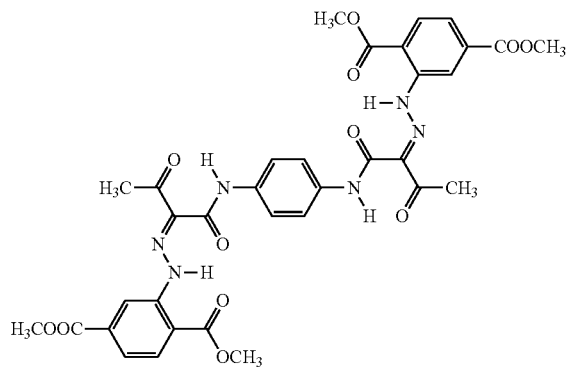
14 Claims, 5 Drawing Sheets

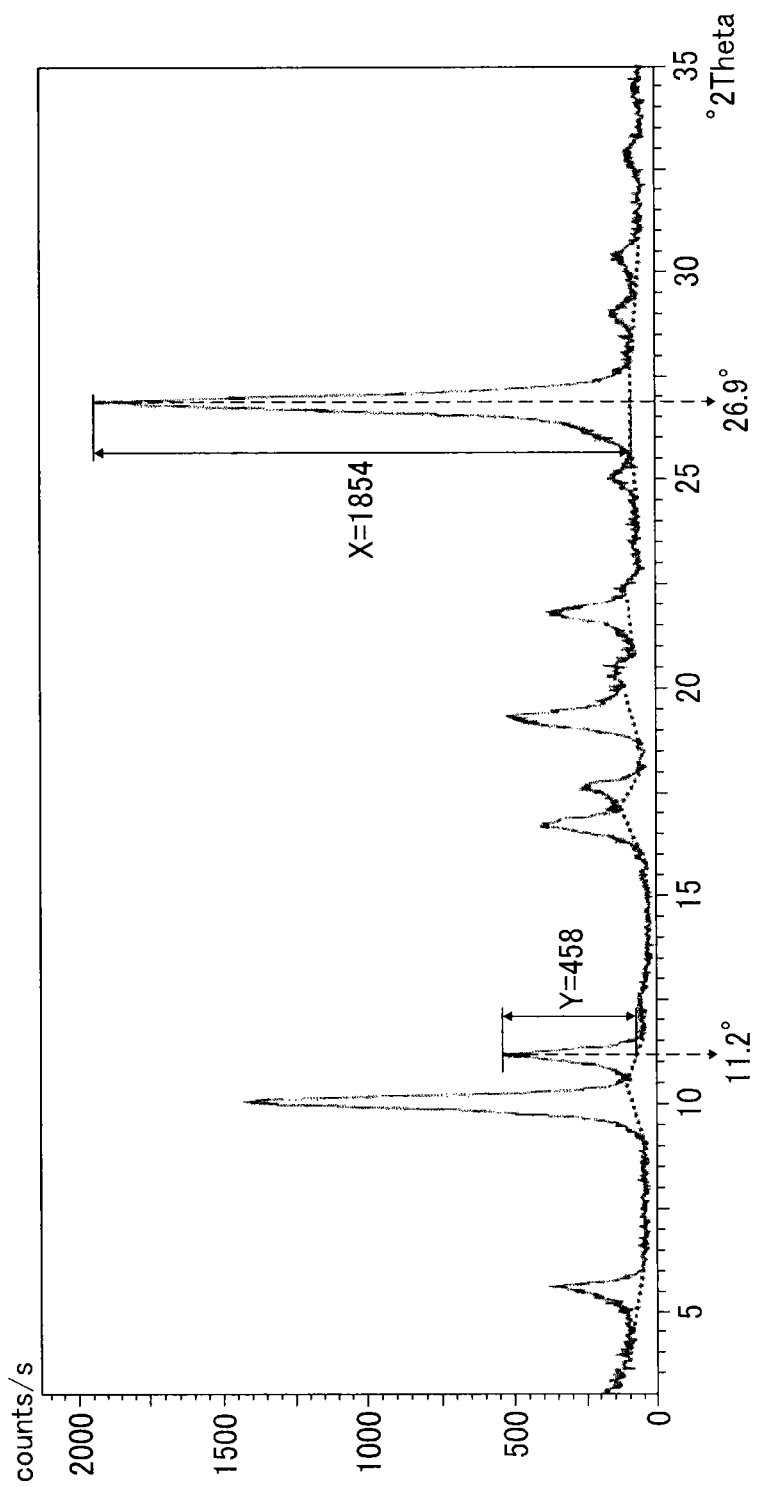

INK COMPOSITION, INK CARTRIDGE, INKJET RECORDING DEVICE, AND INKJET PRINTED MATTER

CROSS-REFERENCE TO RELATED APPLICATIONS

This patent application is based on and claims priority pursuant to 35 U.S.C. §119 to Japanese Patent Application Nos. 2013-182828 and 2014-120565, on Sep. 4, 2013 and Jun. 11, 2014, respectively, in the Japan Patent Office, the entire disclosures of which are hereby incorporated by reference herein.

BACKGROUND

1. Technical Field

The present invention relates to an ink composition, an ink cartridge, an inkjet recording device, and an inkjet printed matter.

2. Background Art

Inkjet printers are significantly diffusing due to their advantages such as low noise and low running costs, and many printers capable of printing color images on plain paper have been actively introduced into the market.

However, it is extremely difficult to satisfy all the properties required of images such as color reproducibility, abrasion resistance, durability, light resistance, drying property, feathering, color bleed, duplex printing, and ink discharging stability. As a result, the ink used is selected based on the prioritized particular application.

In general, the ink for use in inkjet recording is mainly composed of water, with a coloring agent (colorant) and a hydrosoluble solvent such as glycerin to prevent clogging.

As the colorant, dyes are widely used for their excellent coloring and stability. However, the light resistance and water resistance of images are insufficient.

Water resistance is improved to some degree by using special recording media for inkjet having an ink absorbing layer, but is not satisfactory when it comes to plain paper.

To compensate for such defects, ink using a pigment has begun to be used as a coloring agent.

Although pigment ink is successful and superior to dye ink with regard to light resistance, water resistance, etc., the coloring of pigment ink is degraded by coherence of beams of light having different wavelengths and phases produced by multiple reflections of the beams of light within the pigment. For this reason, pigment ink is considered to be inferior to dye ink in general with regard to coloring.

In an attempt to compensate for such degradation of the coloring of pigment ink, pigment particulates that are coated with a resin are used.

According to this method, the fixing property and the gas resistance of pigment ink are further improved by the resin, and in addition dispersion is greatly stabilized. However, currently, pigment ink is not still on a par with dye ink with regard to gloss.

SUMMARY

The present invention provides an improved ink composition that contains a pigment; a copolymer comprising a phosphoric acid group or phosphonic acid group; a hydrosoluble solvent; and water, wherein the pigment is represented by the following chemical formula 1 and satisfies the following relation 1:

$$Y/X \leq 0.20 \qquad \text{Relation 1.}$$

In Relation 1, X represents a peak intensity at a Bragg (2θ±0.2°) angle in a range of 2θ of from 26.5° to 27.5° and Y represents a peak intensity at a Bragg (2θ±0.2°) angle in a range of 2θ of from 11.0° to 11.5° to a CuKα X-ray having a wavelength of 1.541 Å.

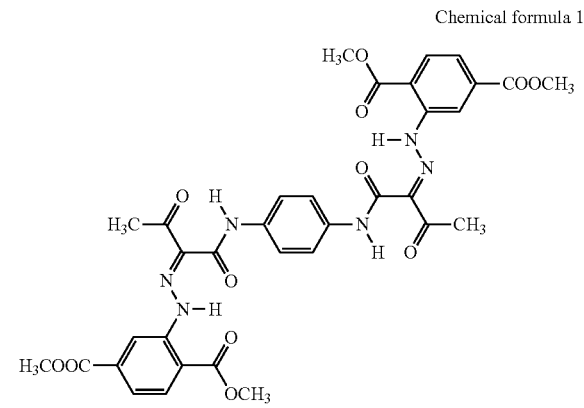

Chemical formula 1

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 6 is a schematic diagram to obtain the peak intensity from an X-ray diffraction spectrum of Comparative Example 1 described later.

DETAILED DESCRIPTION

Figure 1:
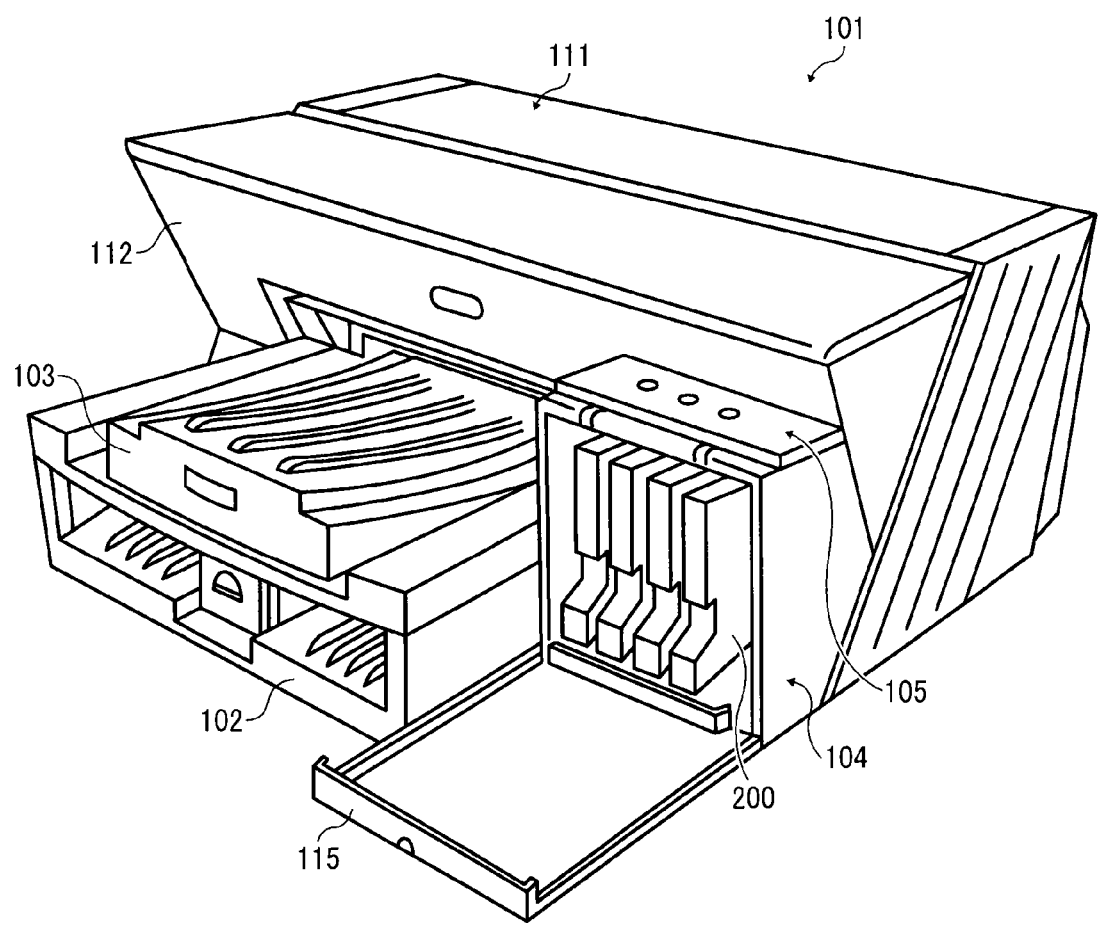
FIG. 1 is a perspective view illustrating an example of the inkjet recording device according to an embodiment of the present invention in which the cover of the ink cartridge installation unit is open.

The present invention is described in detail below.

The present invention is an ink composition containing a pigment;
a copolymer comprising a phosphoric acid group or phosphonic acid group;
a hydrosoluble solvent; and water, wherein the pigment is represented by the following chemical formula 1 and satisfies the following relation 1:

$$Y/X \leq 0.20 \qquad \text{Relation 1.}$$

In the relation 1, X represents a peak intensity at a Bragg (2θ±0.2°) angle in a range of 2θ of from 26.5° to 27.5° and Y represents a peak intensity at a Bragg (2θ±0.2°) angle in a range of 2θ of from 11.0° to 11.5° to a CuKα X-ray having a wavelength of 1.541 Å.

Chemical formula 1

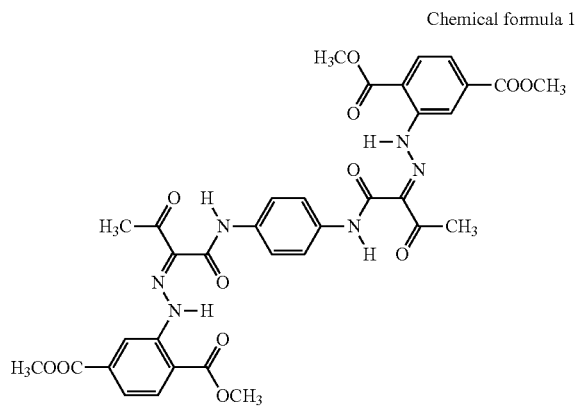

The present invention relates to the ink composition of 1. This ink composition also includes the following ink compositions of 2 to 8 mentioned above.

In addition, the present invention also includes the following ink cartridge, inkjet recording device, and inkjet printed matter of 9 to 11 mentioned above. These are also described in detail.

2. The ink composition of 1 mentioned above, wherein the copolymer containing a phosphoric acid group or phosphonic acid group has a weight average molecular weight of from 5,000 to 50,000.

3. The ink composition of 1 or 2 mentioned above, wherein the copolymer containing a phosphoric acid group contains a structure unit represented by the following chemical formula 2 or a structure unit derived from a radical polymerizable monomer having a diphosphonic acid group:

Chemical formula 2

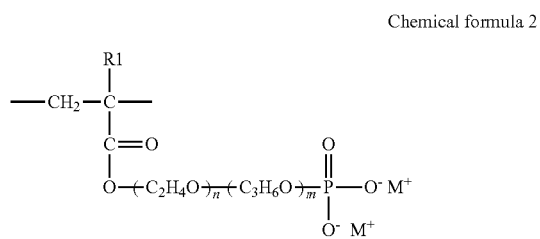

In the chemical formula 2, R1 represents a methyl group or a hydrogen atom, n and m each, independently represent 0 or integers of from 1 to 6 excluding both being 0 at the same time, and M each, independently represents hydrogen atoms, alkali metals, or organic amines.

4. The ink composition of 3 mentioned above, wherein the structure unit represented by the chemical formula 2 accounts for 10% by weight to 60% by weight in the copolymer having a phosphoric acid group.

5. The ink composition of 3 mentioned above, wherein the structure unit derived from a radical polymerizable monomer having a diphosphonic acid group accounts for 10% by weight to 60% by weight in the copolymer having a phosphoric acid group.

6. The ink composition of any one of 1 to 5 mentioned above, wherein the pigment has a volume average particle diameter of from 30 nm to 150 nm.

7. The ink composition of any one of 1 to 6 mentioned above, wherein the hydrosoluble solvent contains at least one of 3-ethyl-3-hydroxymethyl oxetane, isopropylidene glycerol, N,N-dimethyl-β-methoxy propion amide, and N,N-dimethyl-β-buthoxy propion amide.

8. The ink composition of any one of 1 to 7 mentioned above, further containing one of a fluorine-containing compound represented by chemical formula 3 and a fluorine-containing compound represented by chemical formula 4.

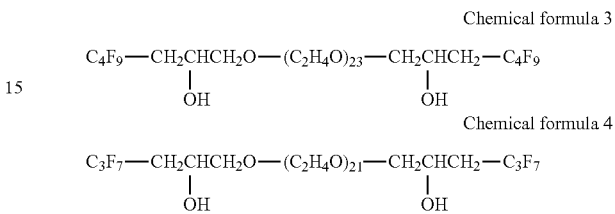

9. An ink cartridge has an ink container to accommodate the ink composition of 1 to 8 mentioned above.

10. An inkjet recording device contains an ink container to accommodate the ink composition of any one of 1 to 8; and a recording head to discharge the ink composition of any one of 1 to 8 mentioned above supplied from the ink container.

11. An inkjet printed matter has a recording medium; and an image recorded on the recording medium using the ink composition of 1 to 8 mentioned above.

The present invention is described in detail with reference to accompanying drawings.

To obtain an excellent coloring image, the present inventors think that it is preferable to fix a colorant such as a pigment on the surface of a recording medium, typically paper, and improve the coloring property of the pigment itself.

However, since widely-used plain paper for copying has a surface containing no material for fixing in an inkjet recording method, ink on the surface permeates inside the paper. For this reason, pigment particles present around the surface are less in number, resulting in no good coloring. Therefore, the thus-obtained image looks dull.

According to the present invention, this problem is solved by a combination of technologies of fixing a pigment on the surface of a recording medium and improving the coloring of the pigment itself.

With regard to the former, a pigment is dispersed by a copolymer having a phosphoric acid group or phosphonic acid group, both having a high reactivity with a calcium ion, and the pigment dispersion is caused to react with a calcium ion disassociated from calcium carbonate widely present on the entire of the paper when the pigment dispersion lands on the paper.

Consequently, pigments agglomerate and remain on the surface, thereby obtaining a recording image having excellent coloring property. A phosphoric acid group and a phosphonic acid group are hydrophilic but become hydrophobic at reaction with a multi-valent metal ion such as calcium ion, magnesium ion, and aluminum ion. For this reason, ink composition for inkjet recording using a copolymer containing a phosphoric acid group or a phosphonic acid group as a pigment dispersant is used on a recording medium containing a multi-valent metal salt, the pigment dispersant adsorbed to the pigment reacts with a multi-valent metal ion eluted from the recording medium and becomes hydrophobic, resulting in agglomeration of the pigment. As a result, permeation of the pigment into paper is subdued, which leads to excellent coloring.

As the latter case, by decreasing the crystallinity of a yellow pigment represented by Chemical formula 1 while maintaining the crystal structure of the pigment in order not to degrade light resistance or gas resistance, coloring as good as that of a dye is demonstrated, thereby to output a recording image having excellent coloring.

A copolymer having a phosphoric acid group or phosphonic acid group is found to have a particularly good compatibility with the disazo-based pigment represented by the chemical formula 1 for an ink composition for inkjet recording containing an organic solvent. That is, the copolymer has good affinity with the disazo-based pigment represented by the chemical formula 1 in ink until it contacts the multi-valent metal ion mentioned above.

After the ink is discharged onto a recording medium, the copolymer smoothly moves from the pigment to the multi-valent metal ion.

This makes it possible to provide an ink composition for inkjet recording that realizes an image having excellent coloring irrespective of the kind of paper.

Pigment

In the present disclosure, the disazo-based pigment represented by the chemical formula 1 is used, which is C.I. Pigment Yellow 155. To obtain an ink composition satisfying the relation 1 described above, it is required to make the size of pigment crystals smaller than conventional pigments to lower the crystallinity. As described below, this is made possible by using a microreactor where dissolved pigments are caused to precipitate in minute reaction fields.

"reducing the crystallinity while maintaining the crystalline structure of a pigment" means that the maximum peak intensity is relatively high to the other peak intensities in an X-ray diffraction spectrum. To improve the coloring of the pigment having a quinacridone skeleton represented by the chemical formula 1, it is suitable to lower peak intensities at other diffraction angles (2θ±0.2°) to the peak intensity X as the highest peak at a diffraction angle (2θ±0.2°) in a range of 2θ of from 26.5° to 27.5°. This reduction is particularly good to improve the coloring property when the following relation 1 is satisfied: Y/X≤0.20. In the relation 1, Y represents the peak intensity at a diffraction angle (2θ±0.2°) in a range of 2θ of from 11.0° to 11.5°.

Y/X≤0.15 is more preferable and Y/X≤0.10 is furthermore preferable.

As a method of reducing the crystallinity of a pigment while maintaining the crystalline structure of the pigment, for example, a method is employed which includes dissolving a pigment in an acid or a solvent temporarily and placing the thus-obtained solution in a poor solvent for re-crystallization. However, in such a method, to prevent the crystal of a pigment from growing excessively, it is necessary to precipitate the pigment quickly in a small reaction field. However, conventionally a solution of a pigment is dropped to a poor solvent while being stirred, the size of a reaction field for precipitation is about 1 cm or greater and the stirring speed is limited, which leads to forming large crystals.

As a consequence, pigment particles having a reduced crystallinity are not formed.

However, a microreactor to precipitate dissolved pigments in minute reaction fields was developed recently, which makes it possible to precipitate pigment particles by minute reaction fields at a high speed while suppressing the growth of crystals. The microreactor is a reaction device to conduct mixing and precipitation for chemical reaction or material production in a micro space having sides of 1 mm or less.

Specific examples thereof include, but are not limited to, mikroSyn (manufactured by SIBATA SCIENTIFIC TECHNOLOGY LTD.) having minute pipes having a size of from 50 µm to 500 µm as a reaction field, MiChS System (manufactured by MiChS Co., Ltd.), and ULREA (manufactured by M Technique Co., Ltd.) having a forced ultra thin layer as a reaction field formed of a gap of from 1 µm to 30 µm between the two rotation disks.

In general, the efficiency of chemical reaction depends on the collision frequency among molecules and energy applied to a system.

Since molecules and heat are not transferred far in a micro space, increasing the collision frequency of molecules and quick heat transfer are possible, which enables quick mixing, quick preparation, quick heat exchange, and quick diffusion.

Therefore, to form a pigment having a reduced crystallinity while maintaining the crystalline structure of the pigment, the size of the reaction field is preferably 100 µm or less and more preferably 30 µm or less.

To dissolve a pigment represented by the chemical formula 1, it is possible to use an acid or an organic solvent.

A strong acid such as strong sulfuric acid, hydrochloric acid, and nitric acid can be used as the acid. Strong sulfuric acid is particularly desirable in terms of solubility and dissolves the pigment of the chemical formula 1 at a concentration of from 3% by weight to 5% by weight.

Specific examples of the organic solvent include, but are not limited to, dimethyl sulfoxide, 1-methyl-2-pyrrolidinone, 1,3-dimethyl-2-imidazolidinone, N,N-dimethyl formamide, and N,N-dimethyl acetamide. Of these, dimethyl sulfoxide is most suitable in particular.

However, since the pigment of the chemical formula 1 has a solubility of less than 1% by weight at room temperature and normal pressure, it is preferable to use strong sulfuric acid to dissolve the pigment of the chemical formula 1.

The temperature of a pigment solution can be raised to the boiling point of the dissolved acid or organic solvent at highest to increase the solubility.

Specific examples of the poor solvent include, but are not limited to, water, methanol, ethanol, isopropanol, or liquid mixtures in which methanol, ethanol, and/or isopropanol is dissolved in water.

If simple water or a liquid mixture of the alcohol mentioned above and water is cooled down to −20° C. to −50°, the poor solvent may coagulate.

Considering that the reaction is fast when the temperature difference between the pigment solution and the solvent is large, it is preferable to use methanol, ethanol, or isopropanol that contains no water because it can be cooled down to lower temperatures.

The size and the crystallinity of pigment particles formed using a microreactor depend on the ratio of the flow rate of a pigment solution to the flow rate of a poor solvent.

The ratio of the flow rate (mL/minute) of the pigment solution to the flow rate (mL/minute) of the poor solvent is preferably from 0.005 to 0.5 and more preferably from 0.01 to 0.1.

When the ratio is small, the reaction speed is high, meaning that the crystallinity of the pigment can be lowered.

When the ratio is 0.5 or less, pigment particles having low crystallinity can be formed.

When the ratio is 0.005 or greater, removing a solvent from a pigment particle and thereafter collecting the pigment particle becomes easy.

Pigment particles that are dispersed in a liquid mixture of an acid and a poor solvent formed by a microreactor according to the methods described above are retrieved as a pigment paste after removing the acid and the solvent using a centrifugal followed by washing with deionized water several times.

The pigment particle diameter dispersed in the ink of the present disclosure is preferably from 30 nm to 150 nm.

To control the pigment particle diameter within this range, it is possible to use, for example, a mixing and kneading and dispersing machine using balls such as a bead mill or a ball mill, a mixing and kneading and dispersing machine using a shearing force such as a roll mill, or an ultrasonic dispersion machine.

Of these, an ultrasonic dispersion machine is suitable for the present disclosure. When the pigment particle diameter is 30 nm or greater, the light resistance of the pigment is improved, thereby reducing the change in color. This is advantageous for a pigment. In addition, when the pigment particle diameter is 150 nm or less, image gloss becomes high. Therefore, it is possible to produce images with good saturation and brightness.

The concentration of the pigment in the ink is preferably from 1% by weight to 15% by weight, more preferably from 2% by weight to 12% by weight, and furthermore preferably from 3% by weight to 9% by weight.

When the pigment concentration is 1% by weight or greater, sufficient coloring power can be obtained and a high saturation and a high image density can be obtained.

In addition, when the pigment concentration is less than 15% by weight, an obtained ink composition is stable for a long period of time because the ink is stabilized.

Copolymer Containing Phosphoric Acid Group or Phosphonic Acid Group

The copolymer for use in the present disclosure is obtained by reacting a monomer of chemical formula 2 or chemical formula 5 having a phosphoric acid group or a phosphonic acid group with a solvent placed in a flask equipped with a stirrer, a thermometer, and a nitrogen gas introducing tube under the presence of a polymerization initiator in a nitrogen atmosphere at about 50° C. to about 150° C.

The viscosity of the aqueous solution or a water liquid dispersion of the synthesized copolymer is adjusted by changing molecular weight. Specifically, monomer concentration during polymerization, the amount of a polymerization initiator, polymerization temperature, and polymerization time are changed.

With regard to the polymerization temperature, a copolymer having a low molecular weight is easily obtained by polymerization at high temperatures for a short period of time.

By contrast, a copolymer having a high molecular weight tends to be obtained by polymerization at low temperatures for a long period of time.

With regard to the amount of a polymerization initiator, if the amount thereof is large, a copolymer having a low molecular weight tends to be obtained. If the amount is small, a copolymer having a high molecular weight tends to be obtained.

With regard to the monomer concentration during polymerization, if the concentration is high, a copolymer having a low molecular weight tends to be obtained. If the concentration is low, a copolymer having a high molecular weight tends to be obtained.

There is no specific limit to the weight average molecular weight of the copolymer having a phosphoric acid group or a phosphonic acid group.

The weight average molecular weight is appropriately selected to a particular application. It is preferably from 3,000 to 60,000, more preferably from 4,000 to 50,000, and furthermore preferably from 5,000 to 30,000.

When the weight average molecular weight is within the preferable range, if the copolymer is used for an ink composition for inkjet recording, the dispersion stability and discharging stability of the ink composition are improved.

The weight average molecular weight can be measured by a known method such as gel permeation chromatography (GPC).

Examples of monomers forming the structure unit of chemical formula 2 are monomers of the chemical formula 2-1 to 2-5 illustrated below.

Specific examples of the products available on market include, but are not limited to, LIGHT ESTER P-1A (Chemical formula 2-1: 2-acroyloxyethyl acid phosphate, manufactured by Kyoeisha Chemical Co. Ltd.), PHOSMER™ M (Chemical formula 2-2: 2-methacroyloxyethyl acid phosphate, manufactured by Unichemical Kyoeisha Chemical Co. LTD.), PHOSMER™ PE (Chemical formula 2-3: acid phosphoxy polyoxy ethylene glycol methacrylate, manufactured by Unichemical Kyoeisha Chemical Co. LTD.), and PHOSMER™ PP (Chemical formula 2-4: acid phosphoxy polyoxy propylene glycol methacrylate, manufactured by Unichemical Kyoeisha Chemical Co. LTD.).

Specific examples of the alkali metal of "M" in the chemical formula 2 include, but are not limited to, lithium, sodium, and potassium.

Specific examples of the organic amine of "M" in the chemical formula 2 include, but are not limited to, alkyl amines such as mono-, di- or tri-methyl amine, mono-, di-, or tri-ethyl amine; alcohol amines such as ethanol amine, diethanol amine, triethanol amine, methyl ethanol amine, methyl diethanol amine, dimethyl ethanol amine, monopropanol amine, dipropanol amine, tripropanol amine, isopropanol amine, trishydroxy methyl amino methane, and 2-amino-2-ethyl-1,3-propane diol (AEPD); and cyclic amines such as choline, morpholine, N-methyl morpholine, N-methyl-2-pyrolidone, and 2-pyrolidone.

Of these, potassium ion is preferable in terms of balance between image density and storage stability.

It is preferable that all $M^+$'s are alkaly methal ions or organic amine ions. It is also preferable that a half number of $M^+$'s is an alkaly methal ion or organic amine ion and the rest are hydrogen ions (proton).

In addition, there is no specific limit to the weight ratio of the structure unit represented by the chemical formula 2 or the structure unit derived from a radical polymerizable monomer having a diphosphonic acid group and it can be suitably determined to a particular application.

The content ratio is preferably from 5% by weight to 80% by weight and more preferably from 10% by weight to 60% by weight to the total amount of the copolymer mentioned above.

When the weight ratio is within the preferable range, if the structure unit is used for an ink composition for inkjet recording, high color saturation is obtained and the dispersion stability and discharging stability of the ink composition are improved.

Table 1

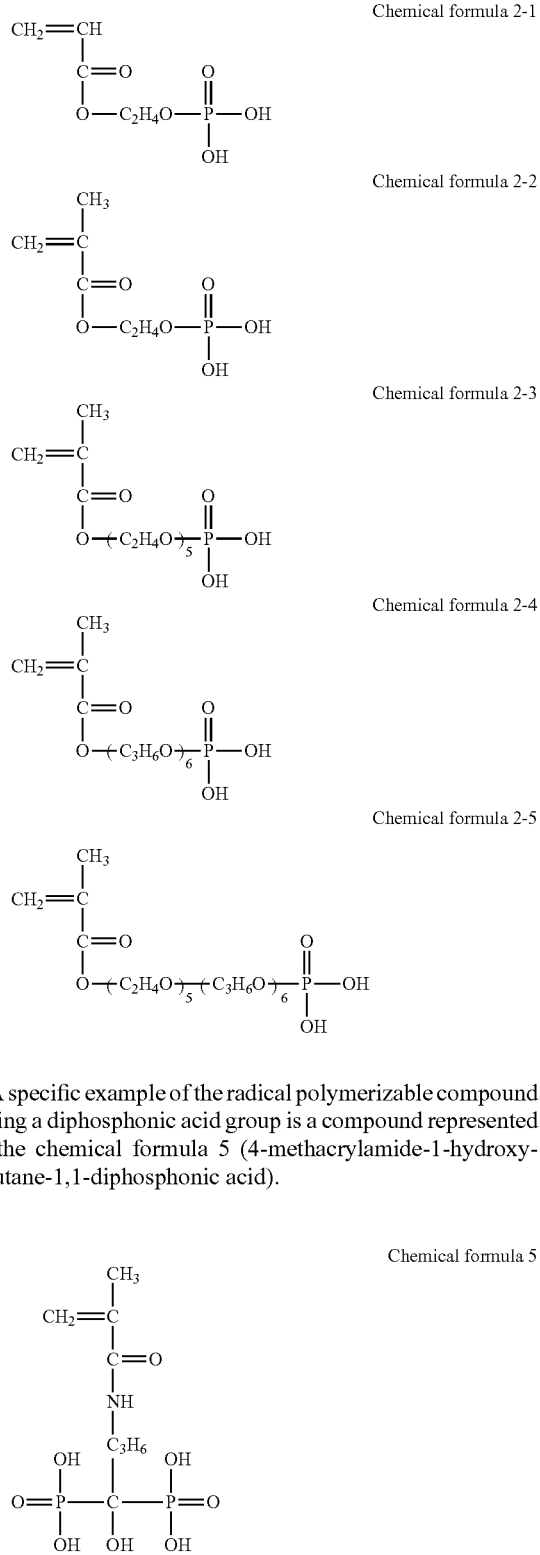

A specific example of the radical polymerizable compound having a diphosphonic acid group is a compound represented by the chemical formula 5 (4-methacrylamide-1-hydroxy-dibutane-1,1-diphosphonic acid).

The polymer mentioned above preferably contains other structures derived from polymerizable monomers thereof.

Such other polymerizable monomers are not particularly limited and may be appropriately selected to a particular application: for example, a polymerizable hydrophobic monomer and a polymerizable hydrophilic monomer.

There is no specific limit to the polymerizable hydrophobic monomer and any can be suitably selected to a particular application.

Specific examples of the polymerizable hydrophobic monomer include, but are not limited to, unsaturated ethylene monomers having aromatic rings such as α-methyl styrene, 4-t-butyl styrene, and 4-chloromethyl styrene; alkyl (meth) acrylates such as methyl (meth)acrylate, ethyl (meth)acrylate, n-butyl (meth)acrylate, dimethyl maleate, dimethyl itaconate, dimethyl fumarate, lauryl (meth)acrylate (C12), tridecyl (meth)acrylate (C13), tetradecyl (meth)acrylate (C14), pentadecyl (meth)acrylate (C15), hexadecyl (meth) acrylate (C16), heptadecyl (meth)acrylate (C17), nonadecyl (meth)acrylate (C19), eicosyl (meth)acrylate (C20), henicosyl (meth)acrylate (C21), and docosyl (meth)acrylate (C22); and unsaturated ethylene monomers having alkyl groups such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-dimethyl-1-hexene, 4,4-dimethyl-1-hexene, 1-nonene, 3,5,5-trimethyl-1-hexene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, and 1-docosene. These can be used alone or in combination.

There is no specific limit to the polymerizable hydrophilic monomer and any can be suitably selected to a particular application.

Specific examples of the polymerizable hydrophilic monomer include, but are not limited to anionic unsaturated ethylene monomers such as (meth)acrylic acid or salts thereof, maleic acid or salts thereof, monomethyl maleate, itaconic acid, monomethyl itaconate, fumaric acid, 4-styrenesulfonic acid, and 2-acrylamide-2-methylpropanesulfonic acid; and nonionic unsaturated ethylene monomers such as 2-hydroxyethyl (meth)acrylate, diethylene glycol mono(meth)acrylate, triethylene glycol mono(meth)acrylate, tetraethylene glycol mono(meth)acrylate, polyethylene glycol mono(meth)acrylate, (meth)acrylamide, N-methylol(meth)acrylamide, N-vinylformamide, N-vinylacetamide, N-vinylpyrrolidone, acrylamide, N,N-dimethylacrylamide, N-t-butylacrylamide, N-octylacrylamide, and N-t-octylacrylamide.

These can be used alone or in combination.

A dispersion element can be prepared by dissolving the copolymer mentioned above in an aqueous medium, adding the pigment to the solution followed by sufficient moistening, and mixing and kneading and dispersing the resultant by high speed stirring by a homogenizer, a disperser using balls such as a bead mill and a ball mill, a mixing and kneading disperser using a shearing force such as a roll mill, or an ultrasonic disperser.

However, after such a dispersion process, coarse particles are contained in most cases, which clog in the inkjet nozzle or the supplying route. Therefore, it is suitable to remove such coarse particles having a particle diameter of 1 μm or greater by a filter or a centrifugal.

In the present disclosure, it is preferable to use the copolymer in an amount of 10% by weight to 100% by weight and, more preferable, from 20% by weight to 50% by weight to the pigment.

When the amount of the copolymer to the pigment is 10% by weight or greater, the pigment can be finely dispersed.

When the amount of the copolymer to the pigment is 100% by weight or less, the copolymer are appropriately attached to the surface of the pigment, the storage of ink is improved and image free from image blur can be produced.

In addition, the content of the dispersed particulate in ink is preferably from about 2% by weight to about 20% by weight and more preferably from 3% by weight to 15% by weight as the solid portion of the total of the pigment and the copolymer.

Hydrosoluble Solvent

The ink of the present disclosure is prepared by using water as a liquid medium. To prevent the ink from drying, improve the dispersion stability, and prevent curling of plain paper, the following hydrosoluble solvents are used.

These hydrosoluble solvents can be used in combination.

Specific examples thereof include, but are not limited to the following:

Polyols such as glycerin, ethylene glycol, diethylene glycol, isopropylidene glycerol, 1,3-butane diol, 3-methyl-1,3-butane diol, triethylene glycol, propylene glycol, dipropylene glycol, trimethylol propane, trimethylol ethane, ethyene glycol, diethylene glycol, dipropylene glycol, tripropylene glycol, tetraethylene glycol, hexylene glycol, polyethylene glycol, polypropylene glycol, 1,5-pentane diol, 1,6-hexane diol, glycerol, 1,2,6-hexane triol, 1,2,4-butane diol, 1,2,3-butane triol, and petriol;

Polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether;

Polyol aryl ethers such as ethylene glycol monophenyl ether and ethylene glycol monobenzyl ether;

Nitrogen-containing heterocyclic compounds such as 2-pyrolidone, N-methyl-2-pyrolidone, N-hydroxyethyl-2-pyrolidone, 1,3-dimethylimidazoline, ε-caprolactam, and γ-butylolactone;

Amides such as formamide, N-methyl formamide, N,N-dimethyl formamide, N,N-dimethyl-β-methoxy propion amide, and N,N-dimethyl-β-buthoxy propion amide;

Amines such as monoethanol amine, diethanol amine, triethanol amine, monoethyl amine, diethylamine, and triethyl amine;

Sulfur-containing compounds such as dimethyl sulfoxide, sulfolane, and thiodiethanol;

3-ethyl-3-hydroxymethyl oxetane, propylene carbonate, and ethylene carbonate.

Of these hydrosoluble solvents, 3-ethyl-3-hydroxymethyl oxetane, isopropylidene glycerol, N,N-dimethyl-β-methoxy propion amide, and N,N-dimethyl-β-buthoxy propion amide are particularly preferable. These are excellent to prevent curling of plain paper.

Sugar groups can be also contained as a hydrosoluble solvent in the present disclosure. Specific examples of the sugar groups include, but are not limited to, monosaccharides, disaccharides, oligosaccharides (including trisaccharides and tetrasaccharides), and polysaccharides. Preferred specific examples thereof include, but are not limited to, glucose, mannose, fructose, ribose, xylose, arabinose, galactose, maltose, cellobiose, lactose, saccharose, trehalose, and maltotriose. Polysaccharides represent sugar in a broad sense and are materials that are present widely in nature, for example, α-cyclodextrine and cellulose.

Specific examples of derivatives of these sugar groups include, but are not limited to, reducing sugars and oxidized sugars of the sugar groups specified above, amino acid derivatives thereof, and thio acid derivatives thereof. Sugar alcohols are particularly preferable and specific examples thereof include, but are not limited to, maltitol and sorbit.

The blend ratio of the pigment and the hydrosoluble solvent has a large impact on the discharging stability of ink discharged from a head. If the blending amount of the hydrosoluble solvent is too small while the ratio of the solid pigment portion is high, water evaporation around ink meniscus of nozzles tends to be accelerated, resulting in bad discharging performance.

The blending ratio of the hydrosoluble solvent is preferably from 10% by weight to 70% by weight and more preferably from 20% by weight to 50% by weight based on the entire of ink. The ink having such a content ratio is extremely good about the test for drying, preservation, and reliability.

Penetrating Agent

By adding a penetrating agent to the ink, the surface tension lowers so that the ink filling property of the ink to the nozzles and the discharging stability ameliorate. In addition, since the ink droplets quickly penetrate into a recording medium after the ink droplets have landed thereon, feathering and color bleeding are reduced.

Surfactants and solvents having a penetrating property are used as the penetrating agent.

The surfactants are classified into anionic surfactants, nonionic surfactants, and ampholytic surfactants by hydrophilic group or fluorine-based surfactants, acetylene-based surfactants, etc. by hydrophobic group.

Specific examples of the anionic surfactants include, but are not limited to, polyoxyethylene alkyl ether acetates, dodecyl benzene sulfonates, laurates, and polyoxyethylene alkyl ether sulfates.

Specific examples of the nonionic surfactants include, but are not limited to, polyols, glycol ethers, polyoxyethylene alkyl ethers, polyoxyethylene alkyl esters, polyoxy ethylene sorbitan aliphatic esters, polyoxyethylene alkyl phenyl ethers, polyoxyethylene alkyl amines, polyoxyethylene alkyl amides, and acetylene glycol.

Specific examples of the fluorine-based surfactants include, but are not limited to, perfluoroalkyl sulfonic acid salts, perfluoroalkyl carboxylic acid salts, perfluoroalkyl phosphoric acid esters, adducts of perfluoroalkyl ethylene oxide, perfluoro alkyl betaine, perfluoro alkyl amine oxide, and perfluoro alkyl ether compounds.

The fluorine-containing compound represented by the chemical formula 3 or the chemical formula 4 is particularly preferably used.

Chemical formula 3
$$C_4F_9-CH_2CHCH_2O-(C_2H_4O)_{23}-CH_2CHCH_2-C_4F_9$$
$$\qquad\qquad|\qquad\qquad\qquad\qquad\qquad|$$
$$\qquad\qquad OH\qquad\qquad\qquad\qquad\quad OH$$

Chemical formula 4
$$C_3F_7-CH_2CHCH_2O-(C_2H_4O)_{21}-CH_2CHCH_2-C_3F_7$$
$$\qquad\qquad|\qquad\qquad\qquad\qquad\qquad|$$
$$\qquad\qquad OH\qquad\qquad\qquad\qquad\quad OH$$

Specific examples of the acetylene glycol-based surfactants include, but are not limited to, acetylene glycols such as 2,4,7,9-tetramethyl-5-desine-4,7-diol, 3,6-dimethyl-4-octine-3,6-diol, and 3,5-dimethyl-1-hexine-3-ol {(for example, SURFYNOL® 104, 82, 465, 485, and TG, manufactured by AIR PRODUCTS and CHEMICALS, INC. (US)}.

Of these, SURFYNOL® 104, 465, and TG are particularly good to demonstrate good printing quality.

Specific examples of the solvents having a penetrating property include, but are not limited to, polyols having eight or more carbon atoms such as 2-ethyl-1,3-hexane diol, and 2,2,4-trimethyl-1,3-pentane diol and glycol ethers.

These surfactants may be used alone or in combination. In the present disclosure, it is preferable to use a penetrating agent in an amount of from 0.01% by weight to 5% weight and, more preferable, from 0.03% weight to 2% weight based on the entire ink.

When the amount of the surfactant is 0.01% by weight or greater, dots sufficiently spread after printing, thereby filling a solid image with the dots. As a result, image density and saturation are maintained high.

When the amount of the surfactant is 5% by weight or less, foaming is subdued so that flow paths in nozzles are not clogged by foams. Consequently, ink droplets are successfully discharged.

Known additives such as pH adjustment agents, anti-septic and anti-fungal agents, anti-corrosion agents, anti-oxidants, ultraviolet absorbers, oxygen absorbers, light stabilizers, and anti-kogation agents can be optionally added to the ink composition of the present disclosure.

pH Adjuster

The pH adjuster is added to stabilize the dispersion state and ink discharging by maintaining the ink in the state of alkali.

However, when the pH is too high, for example, 11 or greater, the head of inkjet and an ink supplying unit tend to be dissolved easily and excessively, which results in modification, leakage, bad discharging performance of the ink, etc.

It is more desirable to add a pH adjuster when the pigment is mixed and kneaded and dispersed in water together with a dispersant than when additives such as a hydrosoluble solvent and a penetrating agent are added after mixing, kneading, and dispersing.

This is because the pH adjuster may disrupt the dispersion by addition thereof.

The pH adjuster is preferable to contain at least one of an alcohol amine, an alkali metal hydroxide, an ammonium hydroxide, a phosphonium hydroxide, and an alkali metal carbonate.

Specific examples of alcohol amines include, but are not limited to, diethanol amine, triethanol amine, and 2-amino-2-ethyl-1,3-propane diol. Specific examples of the alkali metal hydroxides include, but are not limited to, lithium hydroxide, sodium hydroxide, and potassium hydroxide.

Specific examples of the ammonium hydroxides include, but are not limited to, ammonium hydroxide, quaternary ammonium hydroxide, and quaternary phosphonium hydroxide.

Specific examples of the alkali metal carbonates include, but are not limited to, lithium carbonate, sodium carbonate, and potassium carbonate.

Anti-Septic and Anti-Fungal Agent

Specific examples of the anti-septic and anti-fungal agents include, but are not limited, dehydrosodium acetate, sodium sorbinate, 2-pyridine thiol-1-oxide sodium, sodium benzoate, and pentachlorophenol sodium.

Anti-Corrosion Agent

Specific examples of the anti-corrosion agents include, but are not limited to, acid sulfite, thiosodium sulfate, ammonium thiodiglycolate, diisopropyl ammonium nitrite, pentaerythritol quaternary nitride, and dicyclohexyl ammonium nitrite.

Anti-Oxidant

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants.

Ultraviolet Absorbe

Examples of the UV absorber include benzophenone-based UV absorbers, benzotriazole-based UV absorbers, salicylate-based UV absorbers, cyanoacrylate UV absorbers, and nickel-complex-salt-based UV absorbers.

Anti-Kogation Agent

A recording liquid for use in the present disclosure optionally contains an anti-kogation agent.

Kogation is a problematic phenomenon occurring to a thermal head that discharges ink (recording liquid) by utilizing a force of foaming of the ink caused by instant heating upon application of an electric current in a heater. That is, the ink compositions is modified by heating, which adheres to a heater.

A heater which incurs kogation cannot conduct heating properly so that the ink discharging weakens and the ink is not discharged at the worst.

Therefore, an anti-kogation agent is added to the ink composition of the present disclosure to prevent kogation.

Specific examples of the anti-kogation agents include, but are not limited to, polyphosphoric acid, polyamino carboxylic acid, aldonic acid, hydroxy carboxylic acid, polyol phosphoric acid esters, and salts thereof, acids having an amino group and salts thereof, and ammonium salts of acids having a methyl group, a methylene group, and a carboxylic group.

Water

Specific examples of water for use in the present disclosure include, but are not limited to, pure water such as deionozed water, ultrafiltrated water, mill-Q water, and distilled water or ultrapure water.

The content of water is preferably from 20% by weight to 80% by weight to the total amount of ink.

Recording Device

The ink of the present disclosure can be suitably applied to recording systems employing an inkjet recording system such as printers, facsimile machines, photocopiers, multi-functional machines (serving as a printer, a facsimile machine, and a photocopier) for inkjet recording.

Inkjet recording devices, which were used in Examples, are described below.

An inkjet recording device 101 illustrated in FIG. 1 has a sheet feeder tray 102 to accommodate recording media placed therein, a discharging tray 103 installed in the inkjet recording device 101, which stores recording media on which images are recorded (formed), and an ink cartridge (ink accommodating device) inserting unit 104.

On the upper surface of the ink cartridge inserting portion 104 is arranged an operating unit 105 such as operation keys and a display.

The ink cartridge inserting portion 104 has a front cover 115 that is openable and closable to detach and attach an ink cartridge 200.

"111" represents an upper cover and "112" represents the front of the front cover.

Figure 2:
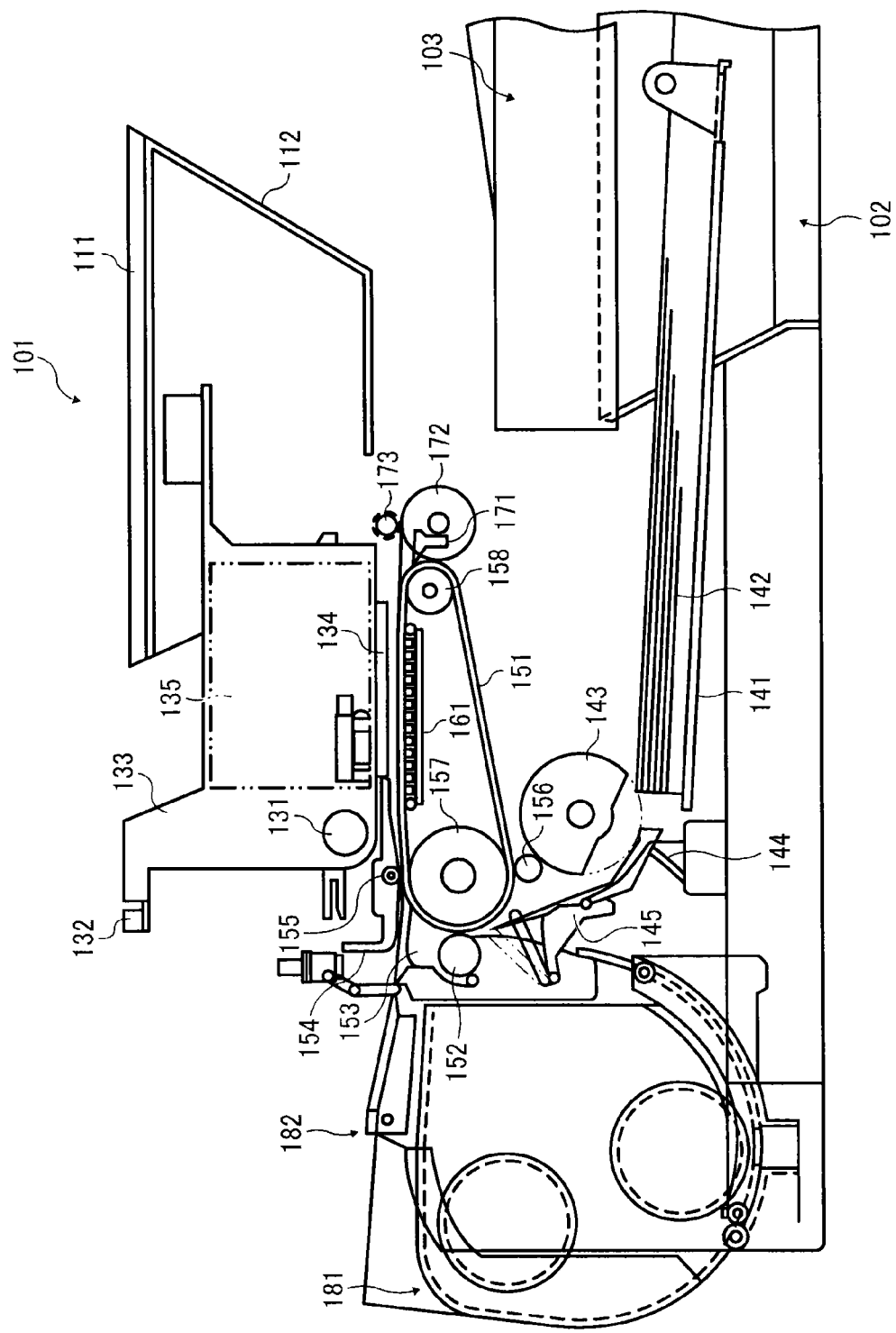
FIG. 2 is a schematic diagram illustrating the entire configuration of the inkjet recording device according to an embodiment of the present invention.

Inside the inkjet recording device 101, as illustrated in FIG. 2, a guide rod 131 and a stay 132 serving as guiding members that laterally bridge side plates provided on the right side and left side hold a carriage 133 slidably movable in the main scanning direction. A main scanning motor moves the carriage 133 for scanning.

The carriage 133 has a recording head 134 having four inkjet recording heads that discharge ink droplets of each color of yellow (Y), cyan (C), magenta (M), and black (Bk) while multiple ink discharging mouths are arranged in the direction crossing the main scanning direction with the ink droplet discharging direction downward.

As the heads for inkjet recording that form the recording head 134, it is possible to use a device having an energygenerating device to discharge ink such as a piezoelectric actuator such as a piezoelectric element, a thermal actuator that utilizes the phase change caused by film boiling of liquid using an electric heat conversion element such as a heat element, a shape-memory alloy actuator that uses the metal phase change due to the temperature change, and an electrostatic actuator that uses an electrostatic force.

The carriage 133 has sub tanks 135 for colors to supply each color ink to the recording head 134.

The ink for inkjet recording of the present disclosure is supplied and replenished to the sub-tank 135 via a tube for supplying ink from the ink cartridge 200 mounted onto the ink cartridge inserting unit 104.

A sheet feeding unit to feed a sheet 142 loaded on a sheet loader (pressure plate) 141 of the sheet feeder tray 102 includes a half-moon shape roller (sheet feeding roller 143) to separate and feed the sheet 142 one by one from the sheet loader 141 and a separation pad 144 that is made of a material having a large friction index and arranged facing the sheet feeding roller 143 while biased towards the sheet feeding roller 143.

A transfer unit to transfer the sheet 142 fed from the sheet feeding unit on the lower side of the recording head 134 includes a transfer belt 151 to electrostatically adsorb and transfer the sheet 142, a counter roller 152 to transfer the sheet 142 fed from the sheet feeding unit via a guide 145 while pinching the sheet 142 with the transfer belt 151, a transfer guide 153 to make the sheet 142 track on the transfer belt 151 by changing the transfer direction of the sheet 142 being sent substantially vertically upward by substantially 90°, a front end pressure roller 155 biased towards the transfer belt 151 by a pressure member 154, and a charging roller 156 to charge the surface of the transfer belt 151.

The transfer belt 151 is an endless form belt, stretched between a transfer roller 157 and a tension roller 158 and rotatable in the belt transfer direction.

This transfer belt 151 includes, for example, a top layer serving as a sheet adsorption surface made of a resin material such as a copolymer (ETFE) of tetrafluoroethylene and ethylene with no resistance control treatment while having a thickness about 40 μm, and a bottom layer (moderate resistance layer, earth layer) made of the same material as the top layer with resistance control treatment with carbon.

On the rear side of the transfer belt 151, a guiding member 161 is arranged corresponding to the printing area by the recording head 134.

A discharging unit to discharge the sheet 142 on which images are recorded by the recording head 134 includes a separation claw 171 to separate the sheet 142 from the transfer belt 151, a discharging roller 172, and a discharging roller 173. A discharging tray 103 is arranged below the discharging roller 173.

A duplex printing sheet feeding unit 181 is detachably attached to the rear side of the inkjet recording device 101.

The duplex printing sheet feeding unit 181 takes in and reverses the sheet 142 that is returned by the reverse rotation of the transfer belt 151 and feeds it again between the counter roller 152 and the transfer belt 151.

A manual sheet feeding unit 182 is provided on the upper surface of the duplex printing sheet feeding unit 181

In this inkjet recording device, the sheet 142 is separated and fed from the sheet feeding unit one by one substantially vertically upward, guided by the guide 145, and transferred while being pinched between the transfer belt 151 and the counter roller 152.

Furthermore, the front end is guided by the transfer guide 153 and pressed against the transfer belt 151 by the front end pressure roller 155 to change the transfer direction substantially 90°.

Since the transfer belt 157 is charged by the charging roller 156 at this point in time, the sheet 142 is electrostatically adsorbed to the transfer belt 151 and transferred.

By driving the recording head 134 according to the image signal while moving the carriage 133, the ink droplet is discharged to the sheet 142 not in motion to record an image for an amount corresponding to one line and thereafter the sheet 142 is transferred in a predetermined amount to conduct recording for the next line.

On receiving a signal indicating that the recording completes or the rear end of the sheet 142 has reached the image recording area, the recording operation stops and the sheet 142 is discharged to the discharging tray 103.

When the amount of ink for inkjet recording remaining in the sub-tank 135 is detected as "approaching to empty", a predetermined amount of the ink is replenished to the sub tank 135 from the ink cartridge 200.

In this inkjet recording device, it is possible to dissemble the chassis of the ink cartridge 200 and replace the ink bag therein when the ink for inkjet is used up in the ink cartridge 200. In addition, the ink cartridge 200 stably supplies the ink even when the ink cartridge 201 is placed on its side and installed by front loading.

Therefore, even when the upside of the inkjet recording device 101 is blocked, for example, it is placed in a rack or something is placed on the upper surface of the inkjet recording device 101, the ink cartridge 200 is easily exchanged.

A serial type (shuttle type) in which the carriage scans is used in this description but this is true in a line-type inkjet recording device having a line type head.

Ink Cartridge (Ink Accommodating Device)

Each ink constituting the inkset can be used in a ink cartridge and any other suitable member can be used in combination.

There is no specific limit to the container. Any form, any structure, any size, and any material can be suitably selected. For example, a container having an ink bag formed of aluminum laminate film, a resin film, etc. can be suitably used.

Figure 3:
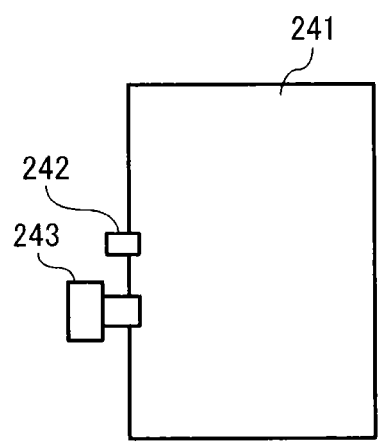
FIG. 3 is a schematic diagram illustrating an example of the ink bag of the ink cartridge according to an embodiment of the present invention.
Figure 4:
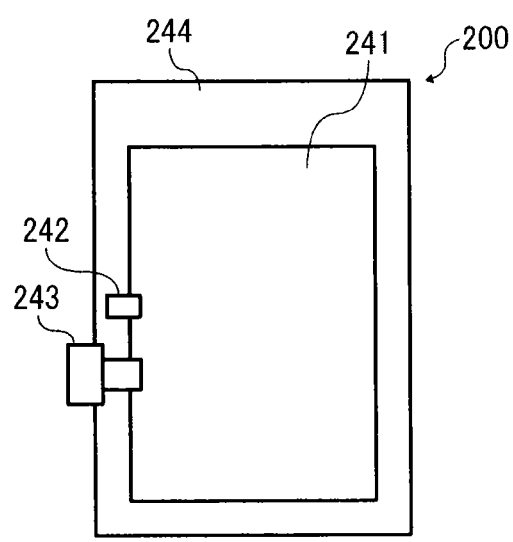
FIG. 4 is a schematic diagram illustrating an example of the ink cartridge that accommodates the ink bag illustrated in FIG. 3 in the cartridge housing.

Next, the ink cartridge is described in detail with reference to FIGS. 3 and 4. FIG. 3 is a schematic diagram illustrating an example of an ink bag 241 of the ink cartridge of the present disclosure. FIG. 4 is a schematic diagram illustrating the ink cartridge 200 that accommodates the ink bag of FIG. 3 in a cartridge case 244.

As illustrated in FIG. 3, after the ink bag 241 is filled with ink through an ink inlet 242 and the air remaining in the ink bag 241 is discharged, the ink inlet 242 is closed by fusion. At the time of use, a needle in the inkjet recording device is pierced into an ink outlet 243 made of a rubber member to allow ink supply to the inkjet recording device. The ink bag 241 is made of a packaging material such as aluminum laminate film having no air permeability.

The inkbag 241 is accommodated in a cartridge housing 244 made of plastic as illustrated in FIG. 4, which is detachably attachable to a various type of inkjet recording device as the ink cartridge 200.

It is particularly preferable that such an ink cartridge is detachably attachable to the inkjet recording device of the present disclosure.

Printed Matter and Manufacturing Method of Printed Matter

The method of manufacturing the printed matter of the present disclosure includes discharging ink from an inkjet head to conduct recording on a recording medium. The discharged ink is the ink composition of the present disclosure.

In addition, the printed matter of the present disclosure has a recording medium on which information or an image is recorded using the ink composition of the present disclosure.

That is, on the printed matter of the present disclosure, information or an image is recorded on a recording medium using the ink composition of the present disclosure.

The printed matter of the present disclosure is manufactured by a step of recording on a recording medium with ink discharged from an inkjet head.

There is no specific limit to the selection of the recording medium.

For examples, plain paper, coated paper for printing, gloss paper, special paper, cloth, film, and transparent sheets can be used. These can be used alone or in combination.

Of these, at least one of plain paper and coated paper for printing is preferable.

Plain paper is advantageous because it is inexpensive. Moreover, coated paper for printing is relatively inexpensive to gloss paper and advantageous to be able to print an image with smooth gloss. Plain paper and coated paper for printing is not dried well. For this reason, they are not practically usable for inkjet printing. However, according to the ink composition of the present disclosure, the drying property of the ink composition is improved so that such recording media can be suitably used.

The printed matter of the present disclosure is of high quality image without blur and excellent in stability over time so that it can be suitably used for various purposes as references, etc., on which images, etc. are recorded.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Synthesis Example a-1

Synthesis of Copolymer a-1

6.67 parts of the monomer of chemical formula 2-1, 13.33 parts of styrene acrylate, and 113.0 parts of ethanol were placed in a flask followed by stirring to obtain a uniform solution.

After nitrogen was blown into this solution for 30 minutes, 1.33 parts of azobis isobutylonitrile was added thereto at 75° C. to conduct polymerization reaction for three hours.

A viscous material was obtained by removing the solvent from the thus-obtained liquid polymerization using an evaporator and added to acetone to retrieve a solid material.

While diluting the thus-obtained solid material (copolymer) with water, sodium hydroxide was added followed by three-day dialysis membrane refinement to achieve 100% acid neutralization. Thereafter, the concentration of the resultant was adjusted with water in such a manner that the concentration of the solid portion was 10% by weight. As a result, a copolymer a-1 was synthesized, in which a phosphoric acid group was 100% neutralized.

The thus-obtained copolymer a-1 was subject to gel permeation chromatography (GPC) measuring.

Synthesis Example a-2

Synthesis of Copolymer a-2

Copolymer a-2 was synthesized using the same recipe as in Synthesis Example a-1 except that the polymerization temperature of Synthesis Example a-1 was changed to 75° C. to 50° and the polymerization time was changed to three hours to 48 hours.

The weight average molecular weight of the thus-obtained copolymer a-2 was measured by using GPC.

Synthesis Example b-1

Synthesis of Copolymer b-1

6.67 parts of the monomer of chemical formula 2-2, 13.33 parts of n-stearyl methacrylate, and 113.0 parts of ethanol were placed in a flask followed by stirring to obtain a uniform solution.

After nitrogen was blown into this solution for 30 minutes, 1.33 parts of azobis isobutylonitrile was added thereto at 65° C. to conduct polymerization reaction for 8 hours. A viscous material was obtained by removing the solvent from the thus-obtained liquid polymerization using an evaporator and added to acetone to retrieve a solid material.

While diluting the thus-obtained solid material (copolymer b-1) with water, potassium hydroxide was added followed by three-day dialysis membrane refinement to achieve 100% acid neutralization. Thereafter, the concentration of the resultant was adjusted with water in such a manner that the concentration of the solid portion was 10% by weight.

As a result, a copolymer b-1 was synthesized, in which a phosphoric acid group was 100% neutralized.

The weight average molecular weight of the thus-obtained copolymer b-1 was measured by using GPC.

Synthesis Example b-2

Synthesis of Copolymer b-2

Copolymer b-2 was synthesized using the same recipe as in Synthesis Example b-1 except that 6.67 parts of the monomer of chemical formula 2-1 for use in Synthesis Example b-1 was changed to 1.0 part and 13.33 parts of n-stearyl methacrylate was changed to 19.0 parts.

The weight average molecular weight of the thus-obtained copolymer b-2 was measured by using GPC.

Synthesis Example b-3

Synthesis of Copolymer b-3

Copolymer b-3 was synthesized using the same recipe as in Synthesis Example b-1 except that 6.67 parts of the monomer of chemical formula 2-1 for use in Synthesis Example b-1 was changed to 2.0 parts and 13.33 parts of n-stearyl methacrylate was changed to 18.0 parts.

The weight average molecular weight of the thus-obtained copolymer b-3 was measured by using GPC.

Synthesis Example b-4

Synthesis of Copolymer b-4

Copolymer b-4 was synthesized using the same recipe as in Synthesis Example b-1 except that 6.67 parts of the monomer of chemical formula 2-1 for use in Synthesis Example b-1 was changed to 12.0 parts and 13.33 parts of n-stearyl methacrylate was changed to 8.0 parts.

The weight average molecular weight of the thus-obtained copolymer b-4 was measured by using GPC.

Synthesis Example b-5

Synthesis of Copolymer b-5

Copolymer b-5 was synthesized using the same recipe as in Synthesis Example b-1 except that 6.67 parts of the monomer of chemical formula 2-1 for use in Synthesis Example b-1 was changed to 14.0 parts and 13.33 parts of n-stearyl methacrylate was changed to 6.0 parts.

The weight average molecular weight of the thus-obtained copolymer b-5 was measured by using GPC.

Synthesis Example b-6

Synthesis of Copolymer b-6

6.67 parts of the monomer of chemical formula 2-3, 13.33 parts of n-stearyl methacrylate, and 113.0 parts of ethanol were placed in a flask followed by stirring to obtain a uniform solution.

After nitrogen was blown into this solution for 30 minutes, 1.33 parts of azobis isobutylonitrile was added thereto at 50° C. to conduct polymerization reaction for 12 hours. A viscous material was obtained by removing the solvent from the thus-obtained liquid polymerization using an evaporator and added to acetone to retrieve a solid material.

While diluting the thus-obtained solid material (copolymer) with water, potassium hydroxide was added followed by three-day dialysis membrane refinement to achieve 100% acid neutralization. Thereafter, the concentration of the resultant was adjusted with water in such a manner that the concentration of the solid portion was 10% by weight.

As a result, a copolymer b-6 was synthesized, in which a phosphoric acid group was 100% neutralized.

The thus-obtained copolymer b-6 was subject to gel permeation chromatography (GPC) measuring.

Synthesis Example b-7

Synthesis of Copolymer b-7

6.67 parts of the monomer of chemical formula 2-4, 13.33 parts of n-stearyl methacrylate, and 113.0 parts of ethanol were placed in a flask followed by stirring to obtain a uniform solution.

After nitrogen was blown into this solution for 30 minutes, 1.33 parts of azobis isobutylonitrile was added thereto at 50° C. to conduct polymerization reaction for 12 hours.

A viscous material was obtained by removing the solvent from the thus-obtained liquid polymerization using an evaporator and added to acetone to retrieve a solid material. While diluting the thus-obtained solid material (copolymer b-7) with water, potassium hydroxide was added followed by three-day dialysis membrane refinement to achieve 100% acid neutralization. Thereafter, the concentration of the resultant was adjusted with water in such a manner that the concentration of the solid portion was 10% by weight.

As a result, a copolymer b-7 was synthesized, in which a phosphoric acid group was 100% neutralized.

The weight average molecular weight of the thus-obtained copolymer b-7 was measured by using GPC.

Synthesis Example b-8

Synthesis of Copolymer b-8

6.67 parts of the monomer of chemical formula 2-5, 13.33 parts of n-stearyl methacrylate, and 113.0 parts of ethanol were placed in a flask followed by stirring to obtain a uniform solution.

After nitrogen was blown into this solution for 30 minutes, 1.33 parts of azobis isobutylonitrile was added thereto at 50° C. to conduct polymerization reaction for 12 hours.

A viscous material was obtained by removing the solvent from the thus-obtained liquid polymerization using an evaporator and added to acetone to retrieve a solid material.

While diluting the thus-obtained solid material (copolymer) with water, potassium hydroxide was added followed by three-day dialysis membrane refinement to achieve 100% acid neutralization. Thereafter, the concentration of the resultant was adjusted with water in such a manner that the concentration of the solid portion was 10% by weight.

As a result, a copolymer b-8 was synthesized, in which a phosphoric acid group was 100% neutralized. The weight average molecular weight of the thus-obtained copolymer b-8 was measured by using GPC.

Synthesis Example c-1

Synthesis of Copolymer c-1

30.0 parts of the monomer of chemical formula 5, 15.0 parts of 2-hydroxy propyl acrylic amide, 30.0 parts of t-octyl acrylic amide, and 100.0 parts of N,N-dimethyl formamide (DMF) were placed in a flask followed by stirring to obtain a uniform solution. After nitrogen was blown into this solution for 30 minutes, 1.33 parts of azobis isobutylonitrile was added thereto at 75° C. to conduct polymerization reaction for 5 hours.

A viscous material was obtained by removing the solvent from the thus-obtained liquid polymerization using an evaporator and added to methanol to retrieve a solid material. While diluting the thus-obtained solid material (copolymer) with water, potassium hydroxide was added followed by three-day dialysis membrane refinement to achieve 100% acid neutralization. Thereafter, the concentration of the resultant was adjusted with water in such a manner that the concentration of the solid portion was 10% by weight.

As a result, a copolymer c-1 was synthesized, in which a phosphonic acid group was 100% neutralized.

The weight average molecular weight of the thus-obtained copolymer c-1 was measured by using GPC.

Synthesis Example c-2

Synthesis of Copolymer c-2

Copolymer c-2 was synthesized using the same recipe as in Synthesis Example c-1 except that the polymerization temperature of Synthesis Example c-1 was changed to 75° C. to 65° C. and the polymerization time was changed to five hours to 12 hours.

The weight average molecular weight of the thus-obtained copolymer c-2 was measured by using GPC.

Synthesis Example c-3

Synthesis of Copolymer c-3

Copolymer c-3 was synthesized using the same recipe as in Synthesis Example c-1 except that the polymerization temperature of Synthesis Example c-1 was changed to 75° C. to 50° C. and the polymerization time was changed to five hours to 24 hours.

The weight average molecular weight of the thus-obtained copolymer c-3 was measured by using GPC.

Synthesis Example d-1

Synthesis of Copolymer d-1

5.0 parts of the monomer of chemical formula 2-2, 5.0 parts of methyl methacrylate (MMA), 10.0 parts of stearyl acrylate, and 113.0 parts of ethanol were placed in a flask followed by stirring to obtain a uniform solution.

After nitrogen was blown into this solution for 30 minutes, 1.33 parts of azobis isobutylonitrile was added thereto at 65° C. to conduct polymerization reaction for 5 hours.

A viscous material was obtained by removing the solvent from the thus-obtained liquid polymerization using an evaporator and added to acetone to retrieve a solid material.

While diluting the thus-obtained solid material (copolymer) with water, diethylmethyl amine was added followed by three-day dialysis membrane refinement to achieve 100% acid neutralization. Thereafter, the concentration of the resultant was adjusted with water in such a manner that the concentration of the solid portion was 10% by weight.

As a result, a copolymer d-1 was synthesized, in which a phosphoric acid group was 100% neutralized.

The weight average molecular weight of the thus-obtained copolymer d-1 was measured by using GPC.

Synthesis Example d-2

Synthesis of Copolymer d-2

Copolymer d-2 was synthesized using the same recipe as in Synthesis Example d-1 except that the polymerization temperature of Synthesis Example d-1 was changed to 65° C. to 60° C. and the polymerization time was changed to five hours to 12 hours.

The weight average molecular weight of the thus-obtained copolymer d-2 was measured by using GPC.

Comparative Synthesis Example e-1

Synthesis of Copolymer e-1

6.0 parts of methyl methacrylate (MMA), 14.0 parts of vinyl naphthalene, and 113.0 parts of ethanol were placed in a flask followed by stirring to obtain a uniform solution.

After nitrogen was blown into this solution for 30 minutes, 1.33 parts of azobis isobutylonitrile was added thereto at 60° C. to conduct polymerization reaction for 15 hours.

A viscous material was obtained by removing the solvent from the thus-obtained liquid polymerization using an evaporator and added to acetone to retrieve a solid material.

While diluting the thus-obtained solid material (copolymer) with water, three-day dialysis membrane refinement was conducted to achieve 100% acid neutralization. Thereafter, the concentration of the resultant was adjusted with water in such a manner that the concentration of the solid portion was 10% by weight.

Thus, a copolymer e-1 was synthesized.

The weight average molecular weight of the thus-obtained copolymer e-1 was measured by using GPC.

Comparative Synthesis Example f-1

Synthesis of Copolymer f-1

10.0 parts of glycerin methacrylate (GLM), 10.0 parts of styrene methacrylate, and 113.0 parts of ethanol were placed in a flask followed by stirring to obtain a uniform solution. After nitrogen was blown into this solution for 30 minutes, 1.33 parts of azobis isobutylonitrile was added thereto at 60° C. to conduct polymerization reaction for 10 hours.

A viscous material was obtained by removing the solvent from the thus-obtained liquid polymerization using an evaporator and added to acetone to retrieve a solid material.

Thereafter, the concentration of the resultant was adjusted with water in such a manner that the concentration of the solid portion was 10% by weight.

Thus, a copolymer f-1 was synthesized.

The weight average molecular weight of the thus-obtained copolymer f-1 was measured by using GPC.

Measuring of Weight Average Molecular Weight

The weight average molecular weight was measured according to GPC method using a column constant temperature tank (CTO-20A, manufactured by Shimadzu Corporation), a detector (RID-10A, manufactured by SHIMADZU CORPORATION), an eluent flowing path pump (LC-20AD, manufactured by SHIMADZU Corporation), a deflating equipment (Degasser DGU-20A, manufactured by SHIMADZU COPORATION), and an autosampler (SIL-20A, manufactured by SHIMADZU COPORATION). As a column, aqueous SEC column TSK gel G3000 PWXL having a removal limit molecular weight of $2 \times 10^5$, TSK gel G5000 PWXL having a removal limit molecular weight of $2.5 \times 10^6$, and TSK gel G6000 PWXL (all manufactured by Tosoh Corporation) having a removal limit molecular weight of $5 \times 10^7$ were connected for use.

A sample adjusted to be 2 g/100 ml by an eluent was used. As the eluent, an aqueous solution was used in which the content of acetic acid and sodium acetate were adjusted to be 0.5 mol/L for each. The column temperature was set to be 40° C. and the flow speed was set to be 1.0 ml/min. The calibration curve was made by using nine standard samples of polyethylene glycol having a molecular weight of 1,065, 5,050, 24,000, 50,000, 107,000, 140,000, 250,000, 540,000, and 920,000.

The synthesis, compositions, the results of the molecular weight are shown in the following table.

TABLE 2

| | | Copolymer Molecular weight M | (neutralizing salt) | Phosphoric acid, diphosphonic acid monomer Chem. formula | n | m | R1 | Content ratio | Copolymer matching monomer |
|---|---|---|---|---|---|---|---|---|---|
| Synthetic Example a-1 | a-1 | 4,800 | Na | 2-1 | 1 | 0 | H | 33% | Styrene acrylate |
| Synthetic Example a-2 | a-2 | 65,000 | Na | 2-1 | 1 | 0 | H | 33% | Styrene acrylate |
| Synthetic Example b-1 | b-1 | 8,500 | K | 2-2 | 1 | 0 | H | 33% | n-stearyl methacrylate |
| Synthetic Example b-2 | b-2 | 8,500 | K | 2-2 | 1 | 0 | $CH_3$ | 33% | n-stearyl methacrylate |
| Synthetic Example b-3 | b-3 | 8,500 | K | 2-2 | 1 | 0 | $CH_3$ | 10% | n-stearyl methacrylate |
| Synthetic Example b-4 | b-4 | 8,500 | K | 2-2 | 1 | 0 | $CH_3$ | 60% | n-stearyl methacrylate |
| Synthetic Example b-5 | b-5 | 8,500 | K | 2-2 | 1 | 0 | $CH_3$ | 70% | n-stearyl methacrylate |
| Sylthetic Example b-6 | b-6 | 8,500 | K | 2-3 | 5 | 0 | $CH_3$ | 33% | n-stearyl methacrylate |
| Synthetic Example b-7 | b-7 | 8,500 | K | 2-4 | 0 | 6 | $CH_3$ | 33% | n-stearyl methacrylate |
| Synthetic Example b-8 | b-8 | 8,500 | K | 2-5 | 5 | 6 | $CH_3$ | 33% | n-stearyl methacrylate |
| Synthetic Example c-1 | c-1 | 5,200 | K | 5 | — | — | — | 40% | 2-hydroxy propyl amide, t-octyl acrylic amide |
| Synthetic Example c-2 | c-2 | 12,000 | K | 5 | — | — | — | 40% | 2-hydroxy propyl amide, t-octyl acrylic amide |
| Synthetic Example c-3 | c-3 | 49,000 | K | 5 | — | — | — | 40% | 2-hydroxy propyl amide, t-octyl acrylic amide |
| Synthetic Example d-1 | d-1 | 6,700 | DEMA | 2-2 | 1 | 0 | $CH_3$ | 25% | MMA, stearyl acrylate |
| Synthetic Example d-2 | d-2 | 24,000 | DEMA | 2-2 | 1 | 0 | $CH_3$ | 25% | MMA, stearyl acrylate |
| Comparative Synthetic Example e-1 | e-1 | 8,500 | K | | — | — | — | — | MMA, vinyl naphthalene |
| Comparative Synthetic Example f-1 | f-1 | 5,200 | — | | — | — | — | — | Glycerin methacrylate, styrene methacrylate |

DEMA: diethyl methylamine

In the case of Comparative Synthesis Example e-1 and f-1 in which no phosphoric acid monomer or diphosphonic acid monomer was used, the column of copolymer matching monomer is read as polymerizable monomer.

Example 1

Using a microreactor (ULREA, manufactured by M Technique Co., Ltd.), methanol at −20° C. as a poor solvent was caused to flow in a flowing amount rate of 600 mL/min. into a thin-layer reactor sandwiched by rotation discs; and a solution kept at 25° C. in which 20 parts of PIGMENT YELLOW 4G represented by chemical formula 1 (manufactured by Hangzhou Dimachema Imp & Exp Co., Ltd.) was dissolved in a liquid mixture of 49 parts of 0.1 N potassium hydroxide, 147 parts of ethanol, and 784 parts of dimethyl sulfoxide was caused to flow into the same rotation discs at an flowing amount rate of 30 mL/min. to precipitate pigment particles;

The thus-obtained pigment liquid dispersion was condensed by a centrifugal and diluted with deionized water repeatedly to adjust the pH of the resultant to be around 8, thereby obtaining a pigment paste having a pigment concentration of 30% by weight.

Thereafter, 6.0 parts of the copolymer a-1 was dissolved in 44.0 parts of deionized water and mixed with 50 parts of the pigment paste prepared as described above. Thereafter, the resultant was subject to a half hour treatment by an ultrasonic homogenizer to obtain a Dispersion Element 1 having a pigment concentration of 15% by weight.

Ink Recipe

| | |
|---|---|
| Dispersion Element 1: | 30.0 parts |
| Glycerin: | 20.0 parts |
| 3-methyl-1,3-butane diol | 15.0 parts |
| 3-ethyl-3-hydroxymethyl oxetane | 5.0 parts |
| N,N-dimethyl-β-methoxy propion amide (Equamide ™ M100, manufactured by Idemitsu Co., Ltd.) | 5.0 parts |
| 2-ethyl-1,3-hexane diol | 2.0 parts |
| Compound represented by chemical formula 3: | 0.05 parts |
| 2-amino-2-ethyl-1,3-propane diol: | 0.5 parts |

| | |
|---|---|
| Anti-septic and anti-fungal agents (Proxel ™ LV, manufactured by ARCH CHEMICALS JAPAN, INC.): | 0.1 parts |
| Deionized water: | 22.35 parts |

A vehicle was manufactured by dissolving the ink recipe excluding the dispersion element 1 in deionized water and thereafter mixed with the dispersion element 1 followed by filtration having an opening size of 1 µm to obtain ink for inkjet recording.

Example 2

Using a microreactor (ULREA, manufactured by M Technique Co., Ltd.), methanol at −20° C. as a poor solvent was caused to flow in a flowing amount rate of 400 mL/min. into a thin-layer reactor sandwiched by rotation discs; and a solution kept at 25° C. in which 30 parts of TONER YELLOW 3GP represented by chemical formula 1 (manufactured by Clariant Japan K.K.) was dissolved in a liquid mixture of 49 parts of 0.1 N potassium hydroxide, 147 parts of ethanol, and 784 parts of dimethyl sulfoxide was caused to flow into the same rotation discs at an flowing amount rate of 10 mL/min. to precipitate pigment particles;

The thus-obtained pigment liquid dispersion was condensed by a centrifugal and diluted with deionized water repeatedly to adjust the pH of the resultant to be around 6, thereby obtaining a pigment paste having a pigment concentration of 30% by weight.

Thereafter, 6.0 parts of the copolymer a-2 was dissolved in 44.0 parts of deionized water and mixed with 50 parts of the pigment paste prepared as described above. Thereafter, the resultant was subject to one-hour dispersion treatment by Ultra Aspec Mill UAM015 type, manufactured by KOTOBUKI INDUSTRIES CO., LTD., followed by filtration of the resultant with a filter having an opening size of 1 µm to obtain a Dispersion Element 2 having a pigment concentration of 15% by weight.

Ink Recipe

Ink for inkjet recording was manufactured in the same manner and recipe as in Example 1 except that the Dispersion Element 1 was changed to the Dispersion Element 2.

Example 3

The pigment paste of Example 3 having a pigment concentration of 30% by weight was obtained in the same manner as in Example 1 except that the flowing amount ratio of the solution flown into the rotation discs of the microreactor in which the pigment was dissolved in the liquid mixture of potassium hydroxide, ethanol, and dimethyl sulfoxide wax changed to 20 mL/min.

Thereafter, 6.0 parts of the copolymer a-1 was dissolved in 44.0 parts of deionized water and mixed with 50 parts of the pigment paste prepared as described above. Thereafter, the resultant was subject to one-hour treatment by an ultrasonic homogenizer to obtain a Dispersion Element 3 having a pigment concentration of 15% by weight.

Ink Recipe

Ink for inkjet recording was manufactured in the same manner and recipe as in Example 1 except that the Dispersion Element 1 was changed to the Dispersion Element 3.

Example 4

Using a microreactor (ULREA, manufactured by M Technique Co., Ltd.), methanol at −20° C. as a poor solvent was caused to flow in a flowing amount rate of 400 mL/min. into a thin-layer reactor sandwiched by rotation discs; and a solution kept at 25° C. in which 30 parts of Ink Jet YELLOW 4G (manufactured by Clariant Japan K.K.) was dissolved in a liquid mixture of 49 parts of 0.1 N potassium hydroxide, 147 parts of ethanol, and 784 parts of dimethyl sulfoxide was caused to flow into the same rotation discs at an flowing amount rate of 10 mL/min. to precipitate pigment particles;

The thus-obtained pigment liquid dispersion was condensed by a centrifugal and diluted with deionized water repeatedly to adjust the pH of the resultant to be around 6, thereby obtaining a pigment paste having a pigment concentration of 30% by weight.

Thereafter, 6.0 parts of the copolymer b-1 was dissolved in 44.0 parts of deionized water and mixed with 50 parts of the pigment paste prepared as described above. Thereafter, the resultant was subject to a one-hour treatment by an ultrasonic homogenizer to obtain a Dispersion Element 4 having a pigment concentration of 15% by weight.

Ink Recipe

| | |
|---|---|
| Dispersion Element 4: | 30.0 parts |
| Glycerin: | 20.0 parts |
| 1,3-butane diol: | 25.0 part |
| 2-ethyl-1,3-hexane diol: | 2.0 parts |
| Surfactant represented by the Chemical formula 4: | 0.05 parts |
| 2-amino-2-ethyl-1,3-propane diol: | 0.5 parts |
| Anti-septic and anti-fungal agents (Proxel ™ LV, manufactured by ARCH CHEMICALS JAPAN, INC.): | 0.1 parts |
| Deionized water: | 22.35 parts |

A vehicle was manufactured by dissolving the ink recipe excluding the dispersion element 4 in deionized water and thereafter mixing with the dispersion element 4 followed by filtration having an opening size of 1 µm to obtain ink for inkjet recording.

Example 5

Ink for inkjet recording was obtained in the same manner and recipe as described in Example 4 except that 25.0 parts of 1,3-butane diol was reduced to 15.0 parts and 10.0 parts of 3-ethyl-3-hydroxymethyl oxetane was added.

Example 6

Ink for inkjet recording was obtained in the same manner and recipe as described in Example 4 except that 25.0 parts of 1,3-butane diol was reduced to 15.0 parts and 10.0 parts of isopropylidene glycerol was added.

Example 7

Ink for inkjet recording was obtained in the same manner and recipe as described in Example 4 except that 25.0 parts of 1,3-butane diol was reduced to 15.0 parts and 10.0 parts of N,N-dimethyl-β-methoxy propion amide was added.

Example 8

Ink for inkjet recording was obtained in the same manner and recipe as described in Example 4 except that 25.0 parts of 1,3-butane diol was reduced to 15.0 parts and 10.0 parts of N,N-dimethyl-β-buthoxy propion amide was added.

Example 9

A Dispersion Element 9 was manufactured in the same manner and recipe as in Example 4 except that the copolymer b-1 was changed to the copolymer b-2.

Ink for inkjet recording was manufactured in the same manner and recipe as in Example 4 except that the Dispersion Element 4 was changed to the Dispersion Element 9.

Example 10

A Dispersion Element 10 was manufactured in the same manner and recipe as in Example 4 except that the copolymer b-1 was changed to the copolymer b-3.

Ink for inkjet recording was manufactured in the same manner and recipe as in Example 4 except that the Dispersion Element 4 was changed to the Dispersion Element 10.

Example 11

A Dispersion Element 11 was manufactured in the same manner and recipe as in Example 4 except that the copolymer b-1 was changed to the copolymer b-4.

Ink for inkjet recording was manufactured in the same manner and recipe as in Example 4 except that the Dispersion Element 4 was changed to the Dispersion Element 11.

Example 12

A Dispersion Element 12 was manufactured in the same manner and recipe as in Example 4 except that the copolymer b-1 was changed to the copolymer b-5.

Ink for inkjet recording was manufactured in the same manner and recipe as in Example 4 except that the Dispersion Element 4 was changed to the Dispersion Element 12.

Example 13

A Dispersion Element 13 was manufactured in the same manner and recipe as in Example 4 except that the copolymer b-1 was changed to the copolymer b-6.

Ink for inkjet recording was manufactured in the same manner and recipe as in Example 4 except that the Dispersion Element 4 was changed to the Dispersion Element 13.

Example 14

A Dispersion Element 14 was manufactured in the same manner and recipe as in Example 4 except that the copolymer b-1 was changed to the copolymer b-7.

Ink for inkjet recording was manufactured in the same manner and recipe as in Example 4 except that the Dispersion Element 4 was changed to the Dispersion Element 14.

Example 15

A Dispersion Element 15 was manufactured in the same manner and recipe as in Example 4 except that the copolymer b-1 was changed to the copolymer b-8.

Ink for inkjet recording was manufactured in the same manner and recipe as in Example 4 except that the Dispersion Element 4 was changed to the Dispersion Element 15.

Example 16

A Dispersion Element 16 was manufactured in the same manner and recipe as in Example 4 except that the pigment (Ink Jet Yellow 4G) of Example 4 was changed to a pigment PIGMENT YELLOW 4 G (manufactured by Hangzhou Dimachema Imp & Exp Co., Ltd.) represented by the chemical formula 1 and the copolymer b-1 was changed to the copolymer c-1.

Ink Recipe

| | |
|---|---|
| Dispersion Element 16: | 30.0 parts |
| Glycerin: | 20.0 parts |
| Ethylene glycol monobutyl ether: | 15.0 parts |
| 2-pyrolidone: | 10.0 parts |
| 2-ethyl-1,3-hexane diol | 2.0 parts |
| EMALGEN LS-106 (polyoxyethylene polyoxypropylene alkyl ether, manufactured by KAO CORPORATION): | 1.0 part |
| 2-amino-2-ethyl-1,3-propane diol: | 0.5 parts |
| Anti-septic and anti-fungal agents (Proxel ™ LV, manufactured by ARCH CHEMICALS JAPAN, INC.): | 0.1 parts |
| Deionized water | 21.4 parts |

A vehicle was manufactured by dissolving the materials specified above other than the Dispersion Element 16 in deionized water and thereafter mixing with the Dispersion Element 16 followed by filtration with a filter having an opening size of 1 μm to obtain ink for inkjet recording.

Example 17

A Dispersion Element 17 was manufactured in the same manner and recipe as in Example 16 except that the copolymer c-1 was changed to the copolymer c-2.

Ink for inkjet recording was manufactured in the same manner as in Example 16 except that the Dispersion Element 16 was changed to the Dispersion Element 17.

Example 18

Ink for inkjet recording was manufactured in the same manner and recipe as in Example 17 except that EMULGEN LS-106 was changed to 0.05 parts of a compound represented by the chemical formula 3 and the amount of deionized water was changed from 21.4 parts to 22.35 parts.

Example 19

Ink for inkjet recording was manufactured in the same manner and recipe as in Example 17 except that EMULGEN LS-106 was changed to 0.05 parts of a compound represented by the chemical formula 4 and the amount of deionized water was changed from 21.4 parts to 22.35 parts.

Example 20

A Dispersion Element 20 was manufactured in the same manner and recipe as in Example 16 except that the copolymer c-1 was changed to the copolymer c-3.

Ink for inkjet recording was manufactured in the same manner as in Example 16 except that the Dispersion Element 16 was changed to the Dispersion Element 20.

Example 21

Using a microreactor (ULREA, manufactured by M Technique Co., Ltd.), methanol at −20° C. as a poor solvent was caused to flow in a flowing amount rate of 400 mL/min. into a thin-layer reactor sandwiched by rotation discs; and a solution kept at 25° C. in which 30 parts of Ink Jet YELLOW 4G (manufactured by Clariant Japan K.K.) represented by chemical formula 1 was dissolved in a liquid mixture of 49 parts of 0.1 N potassium hydroxide, 147 parts of ethanol, and 784 parts of dimethyl sulfoxide was caused to flow into the same rotation discs at an flowing amount rate of 5 mL/min. to precipitate pigment particles;

The thus-obtained pigment liquid dispersion was condensed by a centrifugal and diluted with deionized water repeatedly to adjust the pH of the resultant to be around 6, thereby obtaining a pigment paste having a pigment concentration of 30% by weight.

Thereafter, 6.0 parts of the copolymer d-1 was dissolved in 44.0 parts of deionized water and mixed with 50 parts of the pigment paste prepared as described above. Thereafter, the resultant was subject to one-hour treatment by an ultrasonic homogenizer to obtain a Dispersion Element 21 having a pigment concentration of 15% by weight.

Ink Recipe

| | |
|---|---|
| Dispersion Element 21: | 40.0 parts |
| Glycerin: | 20.0 parts |
| 2-pyrolidone: | 5.0 parts |
| 1,3-butane diol: | 10.0 part |
| 3-methyl-1,3-butane diol | 5.0 parts |
| N,N-dimethyl-β-buthoxy propion amide: (Equamide ™ M100, manufactured by Idemitsu Co., Ltd.) | 5.0 parts |
| 2-ethyl-l,3-hexane diol | 2.0 parts |
| EMALGEN LS-106 (polyoxyethylene polyoxypropylene alkyl ether, manufactured by KAO CORPORATION): | 1.0 part |
| 2-amino-2-ethyl-1,3-propane diol: | 0.5 parts |
| Anti-septic and anti-fungal agents (Proxel ™ LV, manufactured by ARCH CHEMICALS JAPAN, INC.): | 0.1 parts |
| Deionized water | 21.4 parts |

A vehicle was manufactured by dissolving the ink recipe excluding the dispersion element 21 in deionized water and thereafter mixing with the dispersion element 21 followed by filtration having an opening size of 1 μm to obtain ink for inkjet recording.

Example 22

A Dispersion Element 22 having a pigment concentration of 15% by weight was manufactured in the same manner and recipe as in Example 21 except that the copolymer d-1 was changed to the copolymer d-2.

Ink for inkjet recording was manufactured in the same manner and recipe as in Example 21 except that the Dispersion Element 21 was changed to the Dispersion Element 22.

Comparative Example 1

Thereafter, 6.0 parts of the copolymer b-1 for use in Example 4 was dissolved in 79.0 parts of deionized water and mixed with 15 parts of the Ink Jet YELLOW 4G (manufactured by Clariant Japan K.K.). Thereafter, the resultant was subject to a one-hour dispersion treatment by Ultra Aspec Mill UAM015 type, manufactured by KOTOBUKI INDUSTRIES CO., LTD., followed by filtration of the resultant with a filter having an opening size of 1 μm to obtain a Dispersion Element 23 having a pigment concentration of 15% by weight.

Ink Recipe

Ink for inkjet recording was manufactured in the same manner and recipe as in Example 4 except that the Dispersion Element 4 was changed to the Dispersion Element 23.

Comparative Example 2

Thereafter, 6.0 parts of the copolymer a-2 for use in Example 2 was dissolved in 79.0 parts of deionized water and mixed with 15 parts of TONER YELLOW 3GP (manufactured by Clariant Japan K.K.). Thereafter, the resultant was subject to a one-hour dispersion treatment by Ultra Aspec Mill UAM015 type, manufactured by KOTOBUKI INDUSTRIES CO., LTD., followed by filtration of the resultant with a filter having an opening size of 1 μm to obtain a Dispersion Element 24 having a pigment concentration of 15% by weight.

Ink Recipe

Ink for inkjet recording was manufactured in the same manner as in Example 2 except that the Dispersion Element 2 was changed to the Dispersion Element 24.

Comparative Example 3

A Dispersion Element 25 was manufactured in the same manner and recipe as in Example 4 except that the copolymer b-1 was changed to the copolymer e-1.

Ink for inkjet recording was manufactured in the same manner and recipe as in Example 4 except that the Dispersion Element 4 was changed to the Dispersion Element 25.

Comparative Example 4

A Dispersion Element 26 was manufactured in the same manner as in Example 17 except that the copolymer c-2 was changed to the copolymer f-1.

Ink for inkjet recording was manufactured in the same manner as in Example 17 except that the Dispersion Element 17 was changed to the Dispersion Element 26.

TABLE 3

| | Ink composition | | | | | | | | | |
|---|---|---|---|---|---|---|---|---|---|---|
| | Dispersion element | | | | | | | | | |
| | | Co-polymer | \multicolumn{8}{c}{Hydrosoluble solvent} |
| | | | GLY | EGMBE | 2P | 13BD | MBD | EHO | IPG | DMPA | DBPA |
| Ex. 1 | 30% | a-1 | 20% | | | | 15% | 5% | | 5% | |
| Ex. 2 | 30% | a-2 | 20% | | | | 15% | 5% | | 5% | |
| Ex. 3 | 30% | a-1 | 20% | | | | 15% | 5% | | 5% | |
| Ex. 4 | 30% | b-1 | 20% | | | 25% | | | | | |
| Ex. 5 | 30% | b-1 | 20% | | | | 15% | 10% | | | |
| Ex. 6 | 30% | b-1 | 20% | | | | 15% | | 10% | | |
| Ex. 7 | 30% | b-1 | 20% | | | | 15% | | | 10% | |
| Ex. 8 | 30% | b-1 | 20% | | | | 15% | | | | 10% |
| Ex. 9 | 30% | b-2 | 20% | | | 25% | | | | | |
| Ex. 10 | 30% | b-3 | 20% | | | 25% | | | | | |

TABLE 3-continued

| | | | | | | | | | | |
|---|---|---|---|---|---|---|---|---|---|---|
| Ex. 11 | 30% | b-4 | 20% | | | 25% | | | | |
| Ex. 12 | 30% | b-5 | 20% | | | 25% | | | | |
| Ex. 13 | 30% | b-6 | 20% | | | 25% | | | | |
| Ex. 14 | 30% | b-7 | 20% | | | 25% | | | | |
| Ex. 15 | 30% | b-8 | 20% | | | 25% | | | | |
| Ex. 16 | 30% | c-1 | 20% | 15% | 10% | | | | | |
| Ex. 17 | 30% | c-2 | 20% | 15% | 10% | | | | | |
| Ex. 18 | 30% | c-2 | 20% | 15% | 10% | | | | | |
| Ex. 19 | 30% | c-2 | 20% | 15% | 10% | | | | | |
| Ex. 20 | 30% | c-3 | 20% | 15% | 10% | | | | | |
| Ex. 21 | 30% | d-1 | 20% | | 5% | | 10% | 5% | | 5% |
| Ex. 22 | 30% | d-2 | 20% | | 5% | | 10% | 5% | | 5% |
| Com. Ex. 1 | 30% | b-1 | 20% | | | 25% | | | | |
| Com. Ex. 2 | 30% | a-2 | 20% | | | | 15% | 5% | 5% | |
| Com. Ex. 3 | 30% | e-1 | 20% | | | 25% | | | | |
| Com. Ex. 4 | 30% | f-1 | 20% | 15% | 10% | | | | | |

| | Ink composition | | | | | | |
|---|---|---|---|---|---|---|---|
| | Permeating agent | | Chemical | Chemical | pH adjuster | Anti-fungal | Deionized |
| | 2E13HD | LS | formula 3 | formula 4 | AEPD | agent LV | water |
| Ex. 1 | 2% | | 0.05% | | 0.5% | 0.1% | 22.35% |
| Ex. 2 | 2% | | 0.05% | | 0.5% | 0.1% | 22.35% |
| Ex. 3 | 2% | | 0.05% | | 0.5% | 0.1% | 22.35% |
| Ex. 4 | 2% | | | 0.05% | 0.5% | 0.1% | 22.35% |
| Ex. 5 | 2% | | | 0.05% | 0.5% | 0.1% | 22.35% |
| Ex. 6 | 2% | | | 0.05% | 0.5% | 0.1% | 22.35% |
| Ex. 7 | 2% | | | 0.05% | 0.5% | 0.1% | 22.35% |
| Ex. 8 | 2% | | | 0.05% | 0.5% | 0.1% | 22.35% |
| Ex. 9 | 2% | | | 0.05% | 0.5% | 0.1% | 22.35% |
| Ex. 10 | 2% | | | 0.05% | 0.5% | 0.1% | 22.35% |
| Ex. 11 | 2% | | | 0.05% | 0.5% | 0.1% | 22.35% |
| Ex. 12 | 2% | | | 0.05% | 0.5% | 0.1% | 22.35% |
| Ex. 13 | 2% | | | 0.05% | 0.5% | 0.1% | 22.35% |
| Ex. 14 | 2% | | | 0.05% | 0.5% | 0.1% | 22.35% |
| Ex. 15 | 2% | | | 0.05% | 0.5% | 0.1% | 22.35% |
| Ex. 16 | 2% | 1% | | | 0.5% | 0.1% | 21.40% |
| Ex. 17 | 2% | 1% | | | 0.5% | 0.1% | 21.40% |
| Ex. 18 | 2% | | 0.05% | | 0.5% | 0.1% | 22.35% |
| Ex. 19 | 2% | | | 0.05% | 0.5% | 0.1% | 22.35% |
| Ex. 20 | 2% | 1% | | | 0.5% | 0.1% | 21.40% |
| Ex. 21 | 2% | 1% | | | 0.5% | 0.1% | 21.40% |
| Ex. 22 | 2% | 1% | | | 0.5% | 0.1% | 21.40% |
| Com. Ex. 1 | 2% | | | 0.05% | 0.5% | 0.1% | 22.35% |
| Com. Ex. 2 | 2% | | 0.05% | | 0.5% | 0.1% | 22.35% |
| Com. Ex. 3 | 2% | | | 0.05% | 0.5% | 0.1% | 22.35% |
| Com. Ex. 4 | 2% | 1% | | | 0.5% | 0.1% | 21.40% |

GLY: glycerin
EGMBE: ethylene glycol monobutyl ether
2P: 2-pyrolidone
13BD: 1,3-butane diol
MBD: 3-methyl-1,3-butane diol
EHO: 3-ethyl-3-hydroxy methyloxetane
IPG: isopropylidene glycerol
DMPA: N,N-dimethyl-β-methoxy propipon amide
DBPA N,N-dimethyl-β-buthoxy propipon amide
2E13HD: 2-ethyl-1,3-hexane diol
LS: EmulgenLS-106 (polyoxyethylene polyoxypropylene alkyl ether, manufactured by KAO Corporation)
AEPD: 2-amino-2-ethyl-1,3-propane diol
LV: Proxel™ LV, manufactured by ARCH CHEMICALS JAPAN, INC.)
In Comparative Examples 2 and 3, the column of "copolymer" is read as "polymer".

Evaluation Method and Evaluation Result

The evaluation items and the evaluation methods for the dispersion elements and ink for inkjet recording manufactured in Examples and Comparative Examples are described below.

1: Measuring of X Ray Diffraction Spectrum

To measure X-ray diffraction spectra of the pigments manufactured in Examples and Comparative Examples, X'Pert Pro (manufactured by PANalytical Co.) was used.

Using a Cu enclosure tube (Kα characteristic X-ray: wavelength of 1,541 Å) as an X-ray generator, the measuring was conducted under the conditions of a measuring range 2θ of from 3.0° to 35.0°, a sampling width of 0.02°, and a cumulative time of 1.0 second.

Figure 5:
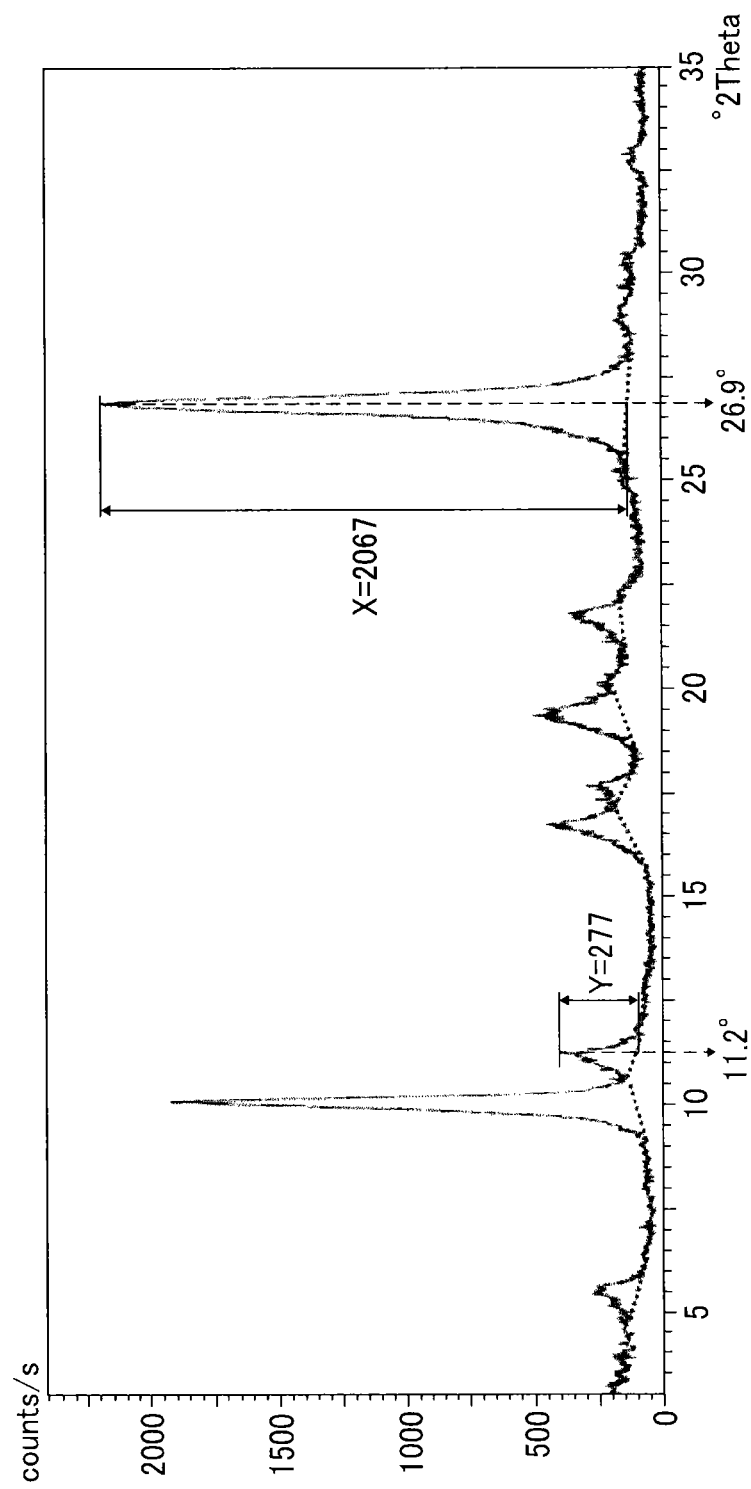
FIG. 5 is a schematic diagram to obtain the peak intensity from an X-ray diffraction spectrum of Example 4 described later.

With regard to the X-ray diffraction measuring of the pigments of Examples, pigment powder was prepared for use by removing moisture from pigment pastes prior to dispersion by heating to 50° C. with a reduced pressure. With regard to the X-ray diffraction measuring of the pigments of Comparative Examples, the pigment powder prior to dispersion was used for measuring. FIG. 5 is an X-ray diffraction spectrum of Example 4 and FIG. 6 is an X-ray diffraction spectrum of Comparative Example 1.

In addition, the results of determination of whether the peak existed in a range of 2θ of from 28.0° to 29.0° from the obtained X-ray diffraction spectrum are shown in Table 4.

In addition, as illustrated in FIG. 5, the peak intensities X and Y were the peaks ascribable to the crystal based on the halo portion ascribable to the non-crystal.

The results of X, Y, and Y/X are shown in Table 4.

TABLE 4

|  | Y/X | Peak X 2θ | Peak X X | Peak Y 2θ | Peak Y Y |
|---|---|---|---|---|---|
| Ex. 1 | 0.198 | 26.9 | 2023 | 11.2 | 401 |
| Ex. 2 | 0.104 | 27.0 | 1980 | 11.4 | 205 |
| Ex. 3 | 0.177 | 27.0 | 2064 | 11.2 | 366 |
| Ex. 4 | 0.134 | 26.9 | 2067 | 11.2 | 277 |
| Ex. 5 | 0.134 | 26.9 | 2067 | 11.2 | 277 |
| Ex. 6 | 0.134 | 26.9 | 2067 | 11.2 | 277 |
| Ex. 7 | 0.134 | 26.9 | 2067 | 11.2 | 277 |
| Ex. 8 | 0.134 | 26.9 | 2067 | 11.2 | 277 |
| Ex. 9 | 0.134 | 26.9 | 2067 | 11.2 | 211 |
| Ex. 10 | 0.134 | 26.9 | 2067 | 11.2 | 277 |
| Ex. 11 | 0.134 | 26.9 | 2067 | 11.2 | 277 |
| Ex. 12 | 0.134 | 26.9 | 2067 | 11.2 | 277 |
| Ex. 13 | 0.134 | 26.9 | 2067 | 11.2 | 277 |
| Ex. 14 | 0.134 | 26.9 | 2067 | 11.2 | 277 |
| Ex. 15 | 0.134 | 26.9 | 2067 | 11.2 | 277 |
| Ex. 16 | 0.102 | 26.8 | 1860 | 11.1 | 189 |
| Ex. 17 | 0.102 | 26.8 | 1860 | 11.1 | 189 |
| Ex. 18 | 0.102 | 26.8 | 1860 | 11.1 | 189 |
| Ex. 19 | 0.102 | 26.8 | 1860 | 11.1 | 189 |
| Ex. 20 | 0.102 | 26.8 | 1860 | 11.1 | 189 |
| Ex. 21 | 0.065 | 27.3 | 1890 | 11.0 | 123 |
| Ex. 22 | 0.065 | 27.3 | 1890 | 11 | 123 |
| Com. Ex. 1 | 0.247 | 26.9 | 1854 | 11.2 | 458 |
| Com. Ex. 2 | 0.211 | 27.0 | 2196 | 11.4 | 463 |
| Com. Ex. 3 | 0.134 | 26.9 | 2067 | 11.2 | 277 |
| Com. Ex. 4 | 0.102 | 26.8 | 1860 | 11.1 | 189 |

2. Measuring of Volume Average Particle Diameter

To measure the volume average particle diameter of ink for inkjet recording manufactured in Examples and Comparative Examples, UPA-EX150 (manufactured by Microtrac, Inc.) was used.

The measuring conditions were that, using the compound of chemical formula 1 having a pigment concentration of 1.40 g/mL, the ink was diluted with deionized water 600 times and placed in a measuring cell followed by measuring at 25° C. for 60 seconds.

The measuring results are shown in Table 5.

3. Measuring of Color (Saturation)

The ink for inkjet recording manufactured in Examples and Comparative Examples were supplied to an inkjet printer (IPSiO GX e5500, manufactured by RICOH CO., LTD.) having the structure illustrated in FIGS. 1 and 2 and a solid image was printed with one pass.

The solid image was printed on the following evaluation sheets.

After the image were dried, the luminance thereof was measured by a reflection type color spectrodensitometer (X-Rite 938, manufactured by X-Rite Incorporate).

Saturation $C^*$ was calculated by the relation: $C^* = \{(a^*)^2 + (b^*)^2\}^{1/2}$ from the obtained values $a^*$ and $b^*$.

The ratio k of the saturation value $C^*$ to the saturation value $C^*_0 = 91.34$ of the standard color (Japan color ver. 2) was calculated by the relation: $k = C^*/C^*_0$ and evaluated according to the following evaluation criteria.

The results are shown in Table 5. Grades A and B are allowable in the evaluation criteria.

Evaluation Sheet

Plain Paper 1: BP-PAPER GF-500 (A4, manufactured by Canon Inc.)

Plain Paper 2: Fore Multi-Purpose (manufactured by HAMMERMILL)

Coated paper: MIRROR COAT Platinum (manufactured by OJI PAPER CO., LTD.)

Evaluation Criteria

A: k≥1.1
B: 1.1>k≥1.0
C: 1.0>k≥0.9
D: 0.9>k

4: Light Resistance

The ink for inkjet recording manufactured in Examples and Comparative Examples were supplied to an inkjet printer (IPSiO GX e5500, manufactured by RICOH CO., LTD.) having the structure illustrated in FIGS. 1 and 2 and a solid image was printed with one pass.

Using the following evaluation sheet, subsequent to printing and drying, the image was irradiated by a xenon feed meter at a black panel temperature of 63° C. for 24 hours followed by measuring the change of the image density before and after the irradiation by a reflection type color spectrodensitometer (manufactured by X-Rite Incorporated) to obtain a color deterioration ratio t (%) according to the following relation.

$t(\%) = [1 - (\text{image density after irradiation})/(\text{image density before irradiation})] \times 100$ The results are shown in Table 5. Grades A and B are allowable in the evaluation criteria.

Evaluation Sheet

Coated paper: MIRROR COAT Platinum (manufactured by OJI PAPER CO., LTD.)

Evaluation Criteria

A: t≤5%
B: 5%<t≤10%
C: 10%<t≤20%
D: 20%<t

5: Measuring of Curl

The ink for inkjet recording manufactured in Examples and Comparative Examples was supplied to the above-described inkjet printer IPSiO GX e5500 (manufactured by Ricoh Co., Ltd.) having a structure illustrated in FIGS. 1 and 2 and a solid image was printed on the entire of an A4 sheet of the following evaluation sheet with a recording density of 600 dpi×300 dpi and one pass.

The attachment amount of ink was adjusted from 300 mg/A4 to 340 mg/A4 and the image obtained 10 minutes after printing was placed on a flat desk with the image face down to measure the distance between the surface of the edge of the sheet and the reference surface by a scale.

The average of the measurement values at the right edge and the left edge of the sheet was defined as the amount of curl.

The evaluation results by the following criteria are shown in Table 5.

Grades A and B are allowable in the evaluation criteria.

Evaluation Sheet

Plain Paper 1: BP-PAPER GF-500 (A4, manufactured by Canon Inc.)

Evaluation Criteria

A: less than 5 mm
B: 5 mm to less than 20 mm
C: 20 mm to less than 50 mm
D: Both edges so curled that sheet forms a cylinder-like shape 6. Evaluation of Discharging Stability The ink for inkjet recording manufactured in Examples and Comparative Examples was set in a printer (IPSio Gx e5500, manufacture by RICOH CO., LTD.) having a configuration illustrated in FIGS. 1 and 2 and evaluated about the discharging stability by the following method.

Images were continuously printed for 10 minutes using the printer in which the nozzle plates described above were set.

That is, the following printing pattern chart was printed on 20 sheets continuously and printing was halt for 20 minutes. This cycle was repeated 50 times to print the chart on 1,000 sheets in total and thereafter the printing pattern chart was printed on one more sheet, which was visually checked to evaluate the image with regard to streaks, dot missing, disturbance of spraying (discharging) of 5% chart solid portion according to the following criteria.

The printing pattern had a printing area of 5% for each color in the entire area of the sheet and was printed with each ink under 100% duty.

The printing condition was that the recording density was 600 dpi×300 dpi with one pass printing.

The evaluation criteria are as follows: Grades A and B are allowable.

The evaluation results are shown in Table 5.

Evaluation Criteria

A: No streaks, no dot missing, no spraying disturbance observed in the solid portion
B: Slight streaks, dot missing, spraying disturbance observed in the solid portion
C: Streaks, dot missing, spraying disturbance observed in the solid portion
D: Streaks, dot missing, spraying disturbance observed all over the solid portion

TABLE 5

|  | Volume average particle diameter (nm) | Saturation | | | Curling | Light resistance | Discharging stability |
| --- | --- | --- | --- | --- | --- | --- | --- |
|  |  | Plain paper 1 | Plain paper 2 | Coated paper | plain paper 1 | Coated paper |  |
| Ex. 1 | 201 | B | A | B | A | A | B |
| Ex. 2 | 168 | B | A | B | A | A | B |
| Ex. 3 | 76 | B | A | B | A | A | A |
| Ex. 4 | 110 | A | A | A | B | A | A |
| Ex. 5 | 110 | A | A | A | A | A | A |
| Ex. 6 | 110 | A | A | A | A | A | A |
| Ex. 7 | 110 | A | A | A | A | A | A |
| Ex. 8 | 110 | A | A | A | A | A | A |
| Ex. 9 | 192 | B | A | A | B | A | A |
| Ex. 10 | 151 | A | A | A | B | A | A |
| Ex. 11 | 181 | A | A | A | B | A | A |
| Ex. 12 | 133 | A | A | A | B | A | B |
| Ex. 13 | 146 | A | A | A | B | A | A |
| Ex. 14 | 98 | A | A | A | B | A | A |
| Ex. 15 | 166 | A | A | B | B | A | A |
| Ex. 16 | 124 | B | A | A | B | A | A |
| Ex. 17 | 167 | A | A | A | B | A | A |
| Ex. 18 | 159 | A | A | A | B | A | A |
| Ex. 19 | 147 | A | A | A | B | A | A |
| Ex. 20 | 174 | A | A | A | B | A | B |
| Ex. 21 | 29 | A | A | A | A | B | A |
| Ex. 22 | 35 | A | A | A | A | A | A |
| Com. Ex. 1 | 157 | C | B | D | C | A | C |
| Com. Ex. 2 | 148 | C | B | D | B | B | B |
| Com. Ex. 3 | 96 | C | D | C | B | A | B |
| Com. Ex. 4 | 105 | C | D | B | B | A | B |

After leaving the printer at 50° C. and 60% RH for one month with a moisture retention cap put on the head surface while the ink was attached to the head surface, the head was returned to the same state as before the leaving by cleaning the head. Thereafter, an intermittent printing test was conducted under the following conditions and the discharging stability was evaluated.

As seen in the results, the ink composition that can produce images with high saturation is provided by containing at least a pigment; a copolymer having a phosphoric acid group or phosphonic acid group; a hydrosoluble solvent; and water and satisfying the relation 1: Y/X≤0.20, where X represents a peak intensity at a Bragg (2θ±0.2°) angle in a range of 2θ of from 26.5° to 27.5° and Y represents a peak intensity at a Bragg (2θ±0.2°) angle in a range of 2θ of from 11.0° to 11.5° to a CuKα X-ray having a wavelength of 1.541 Å.

Moreover, when the weight average molecular weight of the copolymer having a phosphoric acid group or a phosphonic acid group ranges from 5,000 to 50,000, an ink composition having excellent discharging stability is provided.

Furthermore, an ink composition is provided which is capable of producing images having high saturation when the copolymer having a phosphoric acid group contains a structure unit represented by the chemical formula 2.

Additionally, as seen in the results, when the content ratio of the structure unit of the chemical formula 2 ranges from 10% by weight to 60% by weight in the copolymer having a phosphoric acid group, an ink composition having excellent discharging stability is provided.

Furthermore, when the volume average particle diameter of the pigment ranges from 30 nm to 150 nm, images having high saturation and excellent light resistance can be produced.

Furthermore, as seen in the results, when at least one of 3-ethyl-3-hydroxymethyl oxetane, isopropylidene glycerol, N,N-dimethyl-β-methoxy propion amide, and N,N-dimethyl-β-buthoxy propion amide is contained as the hydrosoluble solvent, an image causing no curling of a recording medium on which the image is output can be produced.

Moreover, as seen in the results, when the ink composition contains one of the compounds represented by the chemical formulae 3 and 4, the ink composition having excellent discharging stability can be provided.

Furthermore, an ink cartridge having a container to accommodate the ink composition and an inkjet recording device and a printed matter using the ink composition are also provided.

Having now fully described embodiments of the present invention, it will be apparent to one of ordinary skill in the art that many changes and modifications can be made thereto without departing from the spirit and scope of embodiments of the invention as set forth herein.

What is claimed is:

1. An ink composition comprising:

a pigment;

a copolymer comprising a phosphoric acid group or phosphonic acid group;

a hydrosoluble solvent; and water, wherein the pigment is represented by formula 1 and satisfies the following relation 1:

$$Y/X \leq 0.20 \qquad \text{Relation 1}$$

where X represents a peak intensity at a Bragg (2θ±0.2°) angle in a range of 2θ of from 26.5° to 27.5° and Y represents a peak intensity at a Bragg (2θ±0.2°) angle in a range of 2θ of from 11.0° to 11.5° to a CuKα X-ray having a wavelength of 1.541 Å

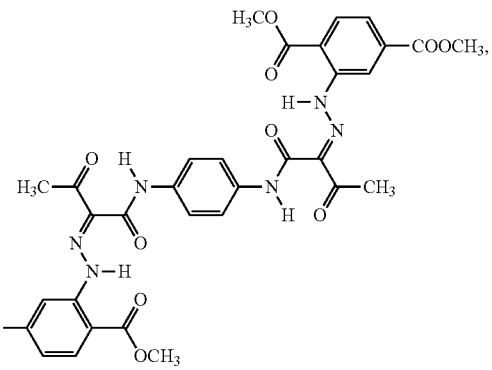

formula 1 wherein the copolymer comprising a phosphoric acid group comprises one of a structure unit represented by formula 2 and a structure unit derived from a radical polymerizable monomer having a diphosphonic acid group:

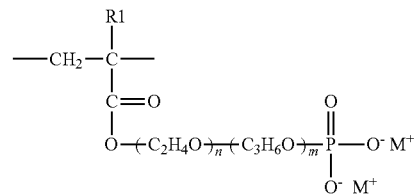

formula 2 where R1 represents a methyl group or a hydrogen atom, n and m each, independently represent 0 or integers of from 1 to 6 excluding both being 0 at the same time and where at least one of n and m is an integer of at least 2, and M each, independently represents hydrogen atoms, alkali metals, or organic amines.

2. The ink composition according to claim 1, wherein the copolymer comprising one of a phosphoric acid group and phosphonic acid group has a weight average molecular weight of from 5,000 to 50,000.

3. The ink composition according to claim 1, wherein the structure unit represented by the chemical formula 2 accounts for 10% by weight to 60% by weight in the copolymer comprising a phosphoric acid group.

4. The ink composition according to claim 1, wherein the structure unit derived from a radical polymerizable monomer having a diphosphonic acid group accounts for 10% by weight to 60% by weight in the copolymer comprising a phosphoric acid group.

5. The ink composition according to claim 1, wherein the pigment has a volume average particle diameter of from 30 nm to 150 nm.

6. The ink composition according to claim 1, wherein the hydrosoluble solvent comprises at least one of 3-ethyl-3-hydroxymethyl oxetane, isopropylidene glycerol, N,N-dimethyl-β-methoxy propion amide, or N,N-dimethyl-β-buthoxy propion amide.

7. The ink composition according to claim 1, further comprising one of a compound represented by formula 3 and a compound represented by formula 4:

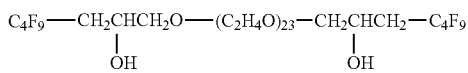

formula 3

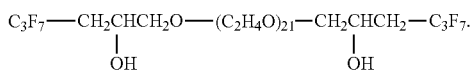

formula 4

8. An ink cartridge comprising:
an ink container containing the ink composition of claim 1.

9. An inkjet recording device comprising:
an ink container containing the ink composition of claim 1; and
a recording head to discharge the ink composition supplied from the ink container.

10. An inkjet printed matter comprising:
a recording medium; and
an image recorded on the recording medium using the ink composition of claim 1.

11. The ink composition according to claim 1, wherein the copolymer comprising a phosphoric acid group comprises one of a structure unit represented by formula 2-3, 2-4, or 2-5:

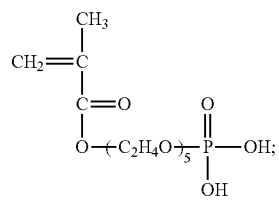

formula 2-3

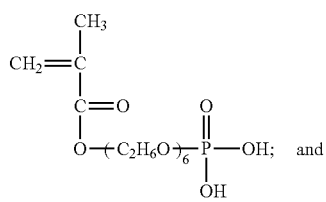

formula 2-4

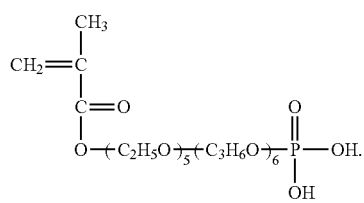

formula 2-5

12. The ink composition according to claim 1, wherein the copolymer comprising a phosphoric acid group comprises one of a structure unit represented by formula 2-3

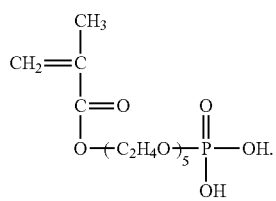

formula 2-3

13. The ink composition according to claim 1, wherein the copolymer comprising a phosphoric acid group comprises one of a structure unit represented by formula 2-4

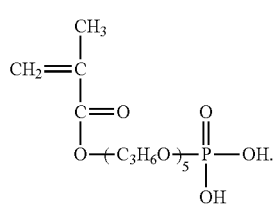

formula 2-4

14. The ink composition according to claim 1, wherein the copolymer comprising a phosphoric acid group comprises one of a structure unit represented by formula 2-5

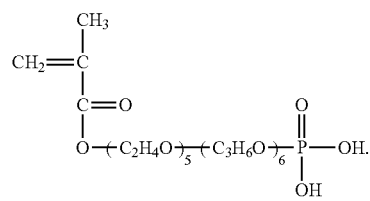

formula 2-5

* * * * *